United States Patent
Abraham et al.

(10) Patent No.: US 9,417,927 B2
(45) Date of Patent: Aug. 16, 2016

(54) RUNTIME CAPACITY PLANNING IN A SIMULTANEOUS MULTITHREADING (SMT) ENVIRONMENT

(71) Applicant: International Business Machines Corporation, Armonk, NY (US)

(72) Inventors: Ansu A. Abraham, Danbury, CT (US); Gary M. King, Watervliet, NY (US); Daniel V. Rosa, Highland, NY (US); Donald W. Schmidt, Stone Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 18 days.

(21) Appl. No.: 14/231,796

(22) Filed: Apr. 1, 2014

(65) Prior Publication Data
US 2015/0277985 A1   Oct. 1, 2015

(51) Int. Cl.
*G06F 9/455* (2006.01)
*G06F 9/50* (2006.01)
*G06F 9/46* (2006.01)

(52) U.S. Cl.
CPC .......... *G06F 9/5077* (2013.01); *G06F 9/45533* (2013.01); *G06F 9/45545* (2013.01); *G06F 9/46* (2013.01); *G06F 2009/45579* (2013.01); *G06F 2209/5018* (2013.01)

(58) Field of Classification Search
CPC ....................................................... G06F 9/46
USPC ............................................................ 718/1
See application file for complete search history.

(56) References Cited

U.S. PATENT DOCUMENTS

| 7,945,908 | B1 | 5/2011 | Waldspurger et al. |
| 8,250,395 | B2 | 8/2012 | Carter et al. |
| 8,402,463 | B2 | 3/2013 | Norton et al. |
| 2003/0208392 | A1* | 11/2003 | Shekar ............ G06Q 10/06 705/7.22 |
| 2006/0242642 | A1* | 10/2006 | Yamamura ......... G06F 9/4881 718/100 |
| 2011/0162062 | A1 | 6/2011 | Kumar et al. |
| 2012/0227042 | A1 | 9/2012 | Zedlewski et al. |
| 2013/0047011 | A1* | 2/2013 | Dice ................. G06F 9/485 713/320 |
| 2013/0311811 | A1* | 11/2013 | Bose ................. G06F 9/50 713/340 |

(Continued)

OTHER PUBLICATIONS

IBM, "z/Architecture: Principles of Operation," SA22-7232-08; Tenth Edition (Sep. 2012); pp. 1-1568 (submitted in two separate parts).

(Continued)

*Primary Examiner* — Li B Zhen
*Assistant Examiner* — Bradford Wheaton
(74) *Attorney, Agent, or Firm* — Cantor Colburn LLP; William A. Kinnaman, Jr.

(57) ABSTRACT

A technique for simultaneous multithreading (SMT) by a computer is provided. An operating system or a second-level hypervisor of the computer manages a logical core configuration for simultaneous multithreading. The operating system or the second-level hypervisor has control over a logical core and control over logical threads on the logical core. The operating system or the second-level hypervisor of the computer configures a host hypervisor to assign an entirety of the logical core to a single physical core, such that one logical core executes per physical core. The logical core is run on the single physical core on an exclusive basis for a period of time, such that the logical threads of the logical core execute on physical threads of the single physical core.

18 Claims, 11 Drawing Sheets

(56) References Cited

U.S. PATENT DOCUMENTS

| | | |
|---|---|---|
| 2014/0068792 A1 | 3/2014 | Kondou et al. |
| 2014/0101411 A1* | 4/2014 | Sakarda ............... G06F 15/7842 712/42 |
| 2014/0282521 A1* | 9/2014 | Lango ................. G06F 9/45533 718/1 |
| 2015/0277984 A1 | 10/2015 | Abraham et al. |

OTHER PUBLICATIONS

List of IBM Patents or Patent Applications Treated as Related—Date Filed: Apr. 18, 2016; 1 page.

* cited by examiner

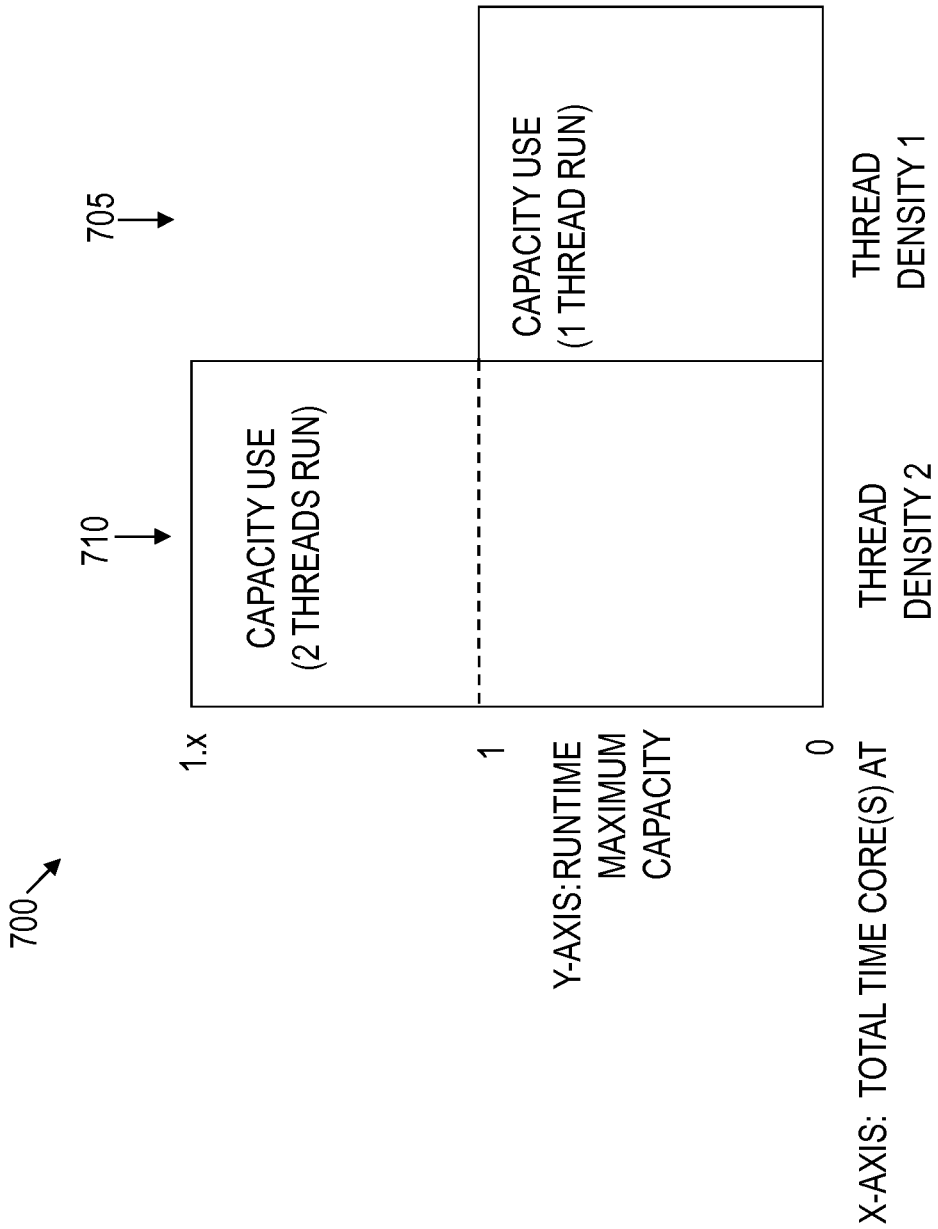

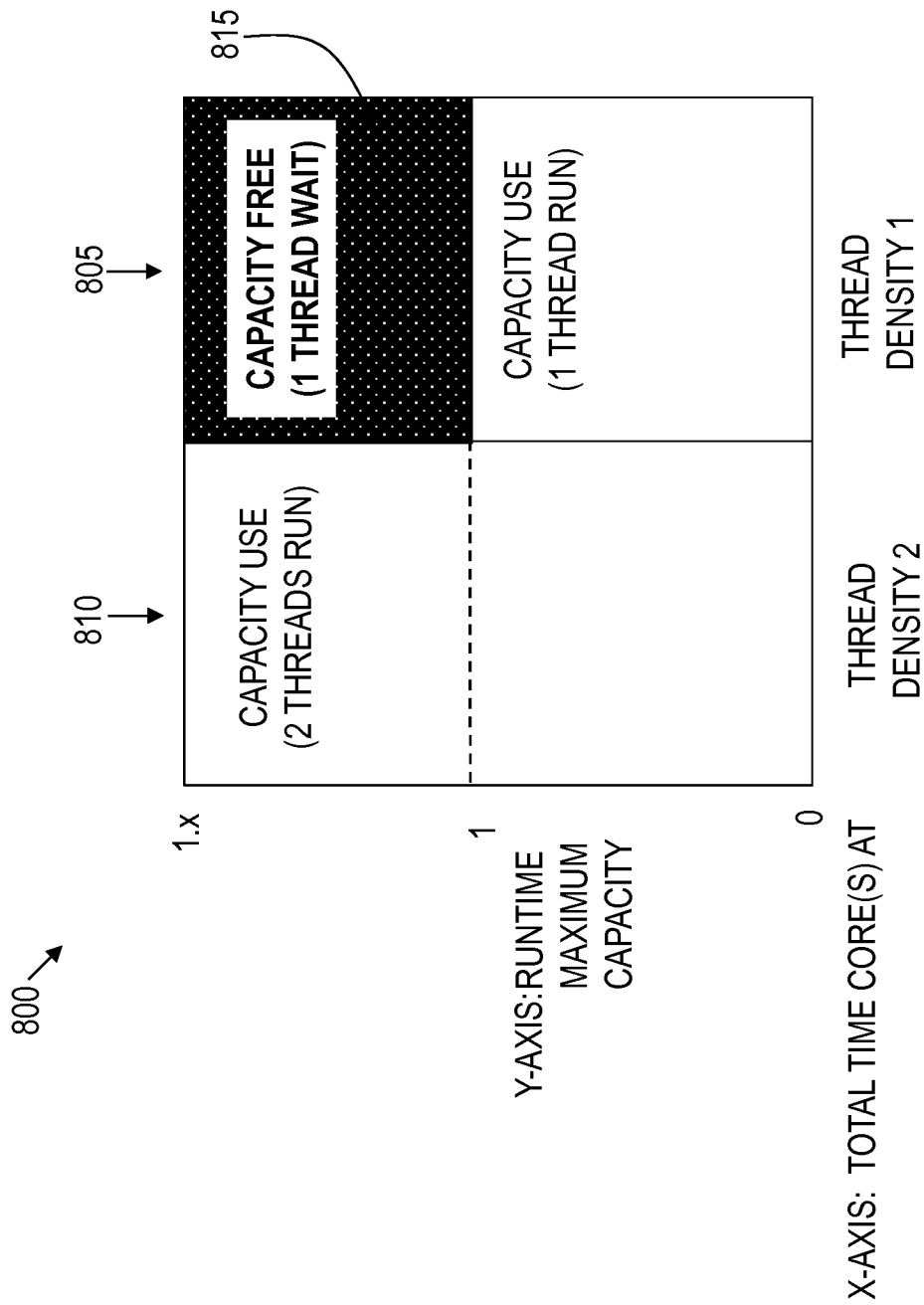

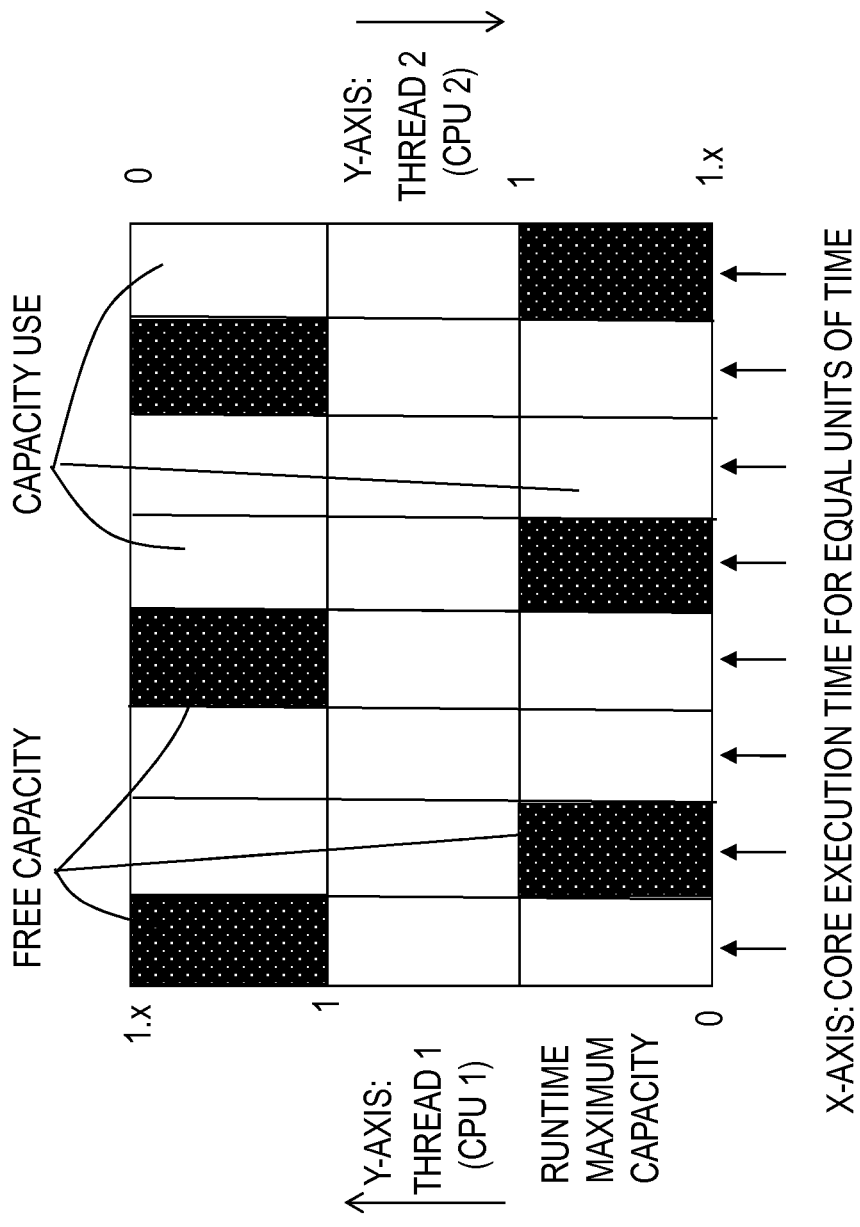

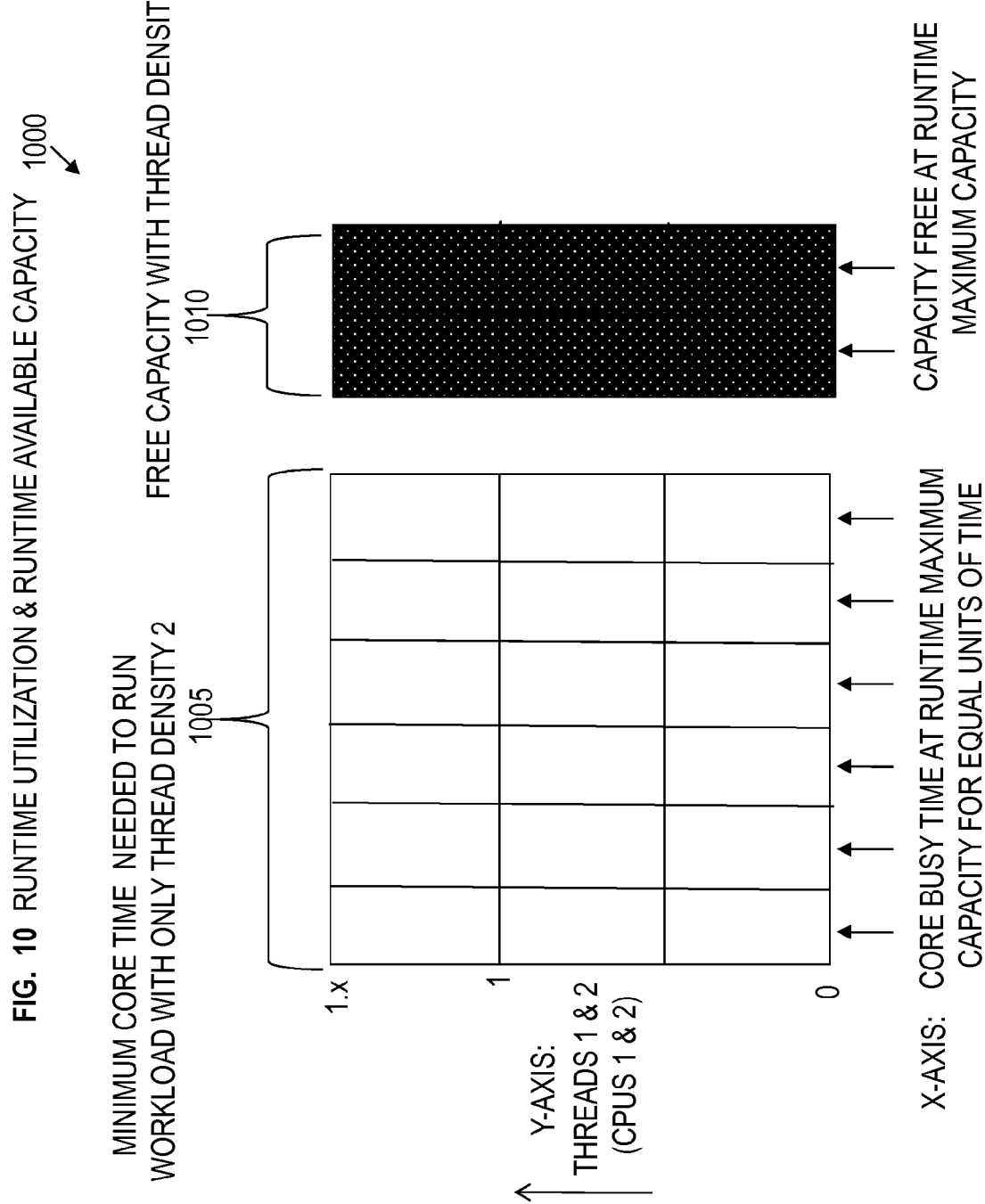
FIG. 10 RUNTIME UTILIZATION & RUNTIME AVAILABLE CAPACITY 1000

US 9,417,927 B2

RUNTIME CAPACITY PLANNING IN A SIMULTANEOUS MULTITHREADING (SMT) ENVIRONMENT

BACKGROUND

The present invention relates to a computer system supporting multithreading (MT), and more specifically, to runtime capacity planning in a simultaneous multithreading (SMT) environment.

As processor speeds of computer systems have increased over the past decades, there has not been a proportional increase in the speed in which the memory of such computer systems can be accessed. Thus, the faster the processor's cycle time, the more pronounced is the delay to resolve data located in memory. The effects of such delays have been mitigated by adding additional caches to the memory nest, and in recent processors, with SMT.

SMT allows various core resources of a processor to be shared by a plurality of instruction streams known as threads. Core resources can include instruction-execution units, caches, translation-lookaside buffers (TLBs), and the like, which may be collectively referred to generally as a core. A single thread whose instructions access data typically cannot utilize the full core resource due to the latency to resolve data located in the memory nest. Multiple threads accessing data sharing a core resource typically result in a higher core utilization and core instruction throughput, but individual threads experience slower execution. In a super-scalar processor simultaneous-multithreading (SMT) implementation, multiple threads may be simultaneously serviced by the core resources of one or more cores.

In contemporary hardware platforms, MT is typically implemented in a manner that is transparent to multiple operating systems (OSes) running different workloads through virtualization of the MT hardware. One advantage of transparent MT is that the OS does not require modification to utilize the MT hardware. With this design point, the MT hardware becomes responsible for balancing the delivery of a high core instruction throughput (by increasing the number of executing threads per core) with a high thread speed (by minimizing the number of executing threads per core). Transparent MT operation with respect to the OS can result in high variability of response time, capacity provisioning, capacity planning, and charge back. This variability can occur because each OS is unaware of whether its work units execute with exclusive use of a core, or whether its tasks are executing as threads that share a core. For example, if the hardware runs a single MT thread per core when there is low compute utilization and runs with high thread density when there is high compute utilization, an OS has difficulty determining capacity in use (and charge back) and total remaining available capacity and delivering a repeatable transaction response time.

SUMMARY

According to one embodiment, a method for simultaneous multithreading (SMT) by a computer is provided. An operating system or a second-level hypervisor of the computer manages a logical core configuration for simultaneous multithreading. The operating system or the second-level hypervisor has control over a logical core and control over logical threads on the logical core. The operating system or the second-level hypervisor of the computer configures a host hypervisor to assign an entirety of the logical core to a single physical core, such that one logical core executes per physical core. The logical core is run on the single physical core on an exclusive basis for a period of time, such that the logical threads of the logical core execute on physical threads of the single physical core.

According to one embodiment, a computer program product for simultaneous multithreading (SMT) is provided. The computer program product includes a computer readable storage medium having program instructions embodied therewith, and the program instructions are executable by a computer to cause the computer to perform a method. An operating system or a second-level hypervisor of the computer manages a logical core configuration for simultaneous multithreading. The operating system or the second-level hypervisor has control over a logical core and control over logical threads on the logical core. The operating system or the second-level hypervisor of the computer configures a host hypervisor to assign an entirety of the logical core to a single physical core, such that one logical core executes per physical core. The logical core is run on the single physical core on an exclusive basis for a period of time, such that the logical threads of the logical core execute on physical threads of the single physical core.

According to one embodiment, an apparatus for simultaneous multithreading (SMT) is provided. The apparatus includes a computer and memory having computer-executable instructions that, when executed by the computer, cause the computer to perform operations. An operating system or a second-level hypervisor of the computer manages a logical core configuration for simultaneous multithreading. The operating system or the second-level hypervisor has control over a logical core and control over logical threads on the logical core. The operating system or the second-level hypervisor of the computer configures a host hypervisor to assign an entirety of the logical core to a single physical core, such that one logical core executes per physical core. The logical core is run on the single physical core on an exclusive basis for a period of time, such that the logical threads of the logical core execute on physical threads of the single physical core.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 7 illustrates a graph of runtime maximum capacity for simultaneous multithreading according to an embodiment.

FIG. 8 illustrates a graph of runtime productivity calculated according to an embodiment.

FIG. 9 illustrates a graph of the effective runtime utilization according to an embodiment.

FIG. 10 illustrates a graph of runtime utilization and runtime available capacity according to an embodiment.

DETAILED DESCRIPTION

Figure 1:
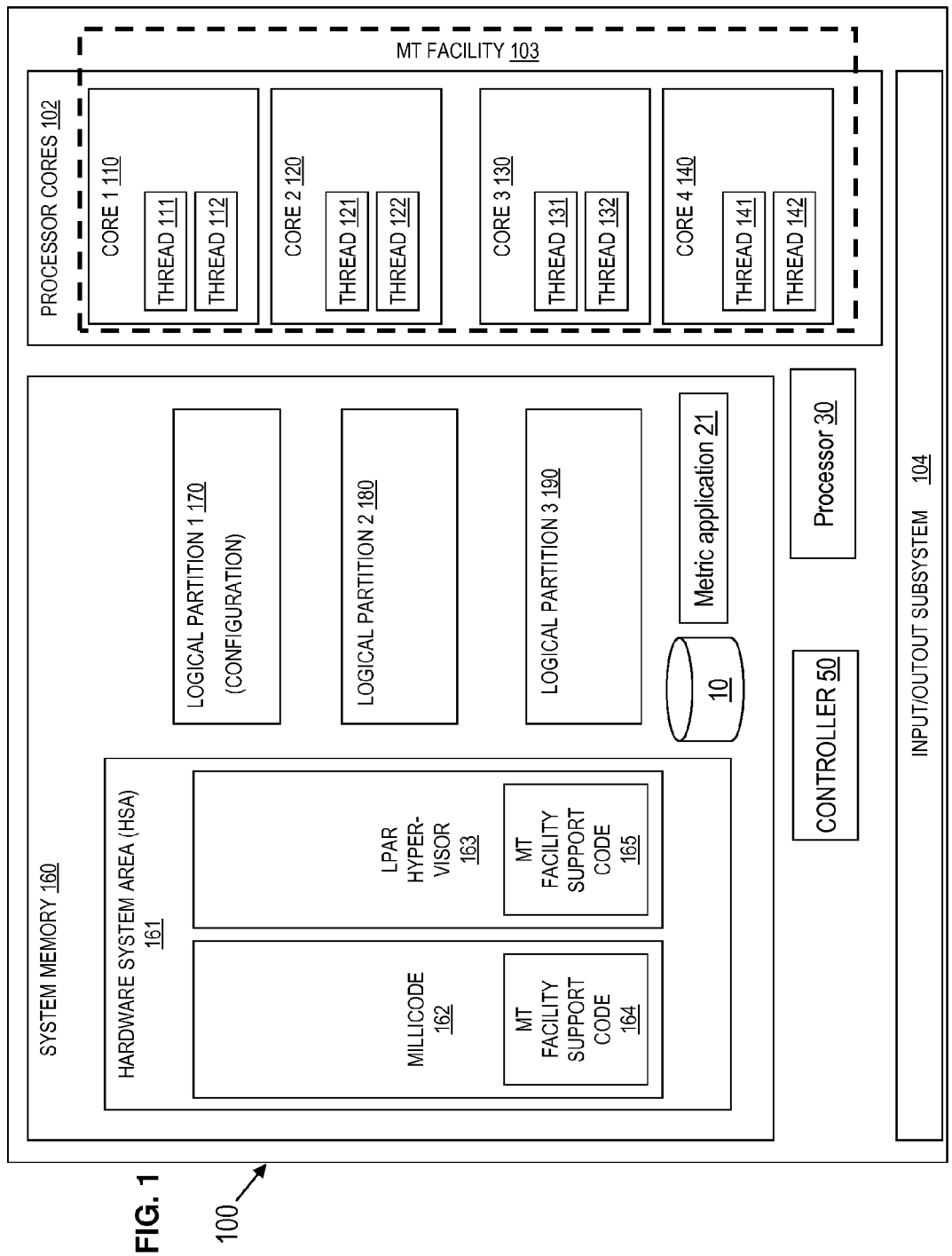
FIG. 1 illustrates a computer system as an example of a computing environment that supports simultaneous multithreading (SMT) according to an embodiment.

In computer systems (such as System z computer systems by International Business Machines Corporation (IBM)) of embodiments, guest hypervisors and operating systems manage and control the guest's workload and what executes on each thread for each core. Combining these design points with algorithms to steer cores to execute with a high thread density allows embodiments (including System z computer systems) to deliver a repeatable core capacity gain, repeatable thread speed degradation, and repeatable workload response time.

With SMT workload repeatability in place, guest hypervisors and operating systems require a way to measure the SMT effects on their workload at runtime. According to embodiments, core counter instrumentation provides the necessary insights in SMT to calculate all capacity planning metrics and core utilization with respect to capacity with 1 SMT measurement at runtime. Embodiments provide the software algorithms to turn the industry's uncontrollable, unmanageable, and variable SMT solution into a controllable, manageable, and repeatable SMT solution on computer systems (e.g., the System z computer system).

As used herein, a logical thread refers to a single guest instruction stream and its associated state. That is, at an architecture level, each logical thread represents an independent central processing unit (CPU). A logical core consists of multiple logical threads. Hardware dispatches a logical core (and all its logical threads) to a physical core (and its physical threads) and maintains the guest state. Therefore, the terms "thread" and "CPU" may be used interchangeably herein.

In an exemplary embodiment, a CPU contains sequencing and processing facilities for instruction execution, interruption action, timing functions, initial program loading, and other machine-related functions. A CPU defines logical functions that may map to a variety of underlying physical implementations. The CPU, in executing instructions, can process binary integers and floating-point numbers (e.g., binary, decimal, and hexadecimal) of fixed length, decimal integers of variable length, and logical information of either fixed or variable length. Processing may be in parallel or in series. The width of processing elements, multiplicity of shifting paths, and the degree of simultaneity in performing different types of arithmetic can differ from one model of CPU to another without affecting the logical results.

Instructions which the CPU executes can include a number of instruction classes, such as: general, decimal, floating-point-support (FPS), binary-floating-point (BFP), decimal-floating-point (DFP), hexadecimal-floating-point (HFP), control, and I/O instructions. The general instructions can be used in performing binary-integer-arithmetic operations and logical, branching, and other non-arithmetic operations. The decimal instructions operate on data in decimal format. The BFP, DFP, and HFP instructions operate on data in BFP, DFP, and HFP formats, respectively, while the FPS instructions operate on floating-point data independent of the format or convert from one format to another. Privileged control instructions and the I/O instructions can be executed when the CPU is in a supervisor state, and semi-privileged control instructions can be executed in a problem state, subject to appropriate authorization mechanisms.

The CPU provides registers which are available to programs but do not have addressable representations in main storage. The registers can include, for instance, a current program-status word (PSW), general registers, floating-point registers and a floating-point-control register, vector registers, control registers, access registers, a prefix register, a time-of-day (TOD)-programmable register, and registers for a clock comparator and CPU timer. This set of registers may be referred to as the CPU's architected register context. Each CPU in a configuration can provide access to a TOD clock, which may be shared by all CPUs in the configuration. An instruction operation code can determine which type of register is to be used in an operation.

Each CPU may have a type attribute that indicates whether it provides a full complement of functions and facilities (e.g., a general CPU), or whether it is intended to process specific types of workloads (e.g., a specialty CPU). A primary CPU is either a general CPU or a CPU having the same type as the CPU started following a last initial program load (IPL) operation (the IPL CPU). A secondary CPU is any CPU other than a general CPU having a CPU type that differs from the IPL CPU.

With simultaneous multithreading (SMT), multiple threads with ready instructions (not resolving a cache miss) compete to execute instructions on the same physical core. Running cache intensive workloads with SMT yields core capacity gains (i.e., the physical core executes more instructions) and thread speed degradations (threads executing instructions can temporarily block ready instructions of other threads). Core cycles with only 1 non-waiting thread receive no core capacity gain and no thread speed degradation. Note that a non-waiting thread is a thread executing/running on the physical core. Core cycles with multiple non-waiting threads receive core capacity gains and thread speed degradations, where each additional thread yields a smaller core capacity gain and larger thread speed degradation.

The state-of-the-art system hardware/software stack needs to address the following SMT industry shortcomings (which are addressed by embodiments disclosed herein):

(1) The hypervisor or native hardware provides SMT transparently and can dispatch any guest threads on any core. The hypervisor can legitimately choose to dispatch multiple guest threads originating from different guests (potentially running different workloads) on the same core. This design point also ensures the guest can only manage an individual thread resource and has no control over (or even awareness of) the other threads. Quantifying the core capacity gain the industry design provides is impossible due to the hypervisor's inability to execute all guests' workloads identically again. The industry approach to SMT promotes uncontrollable variability. However, any workload exploiting SMT on computer systems of embodiments are configured to receive a repeatable response time, core capacity gain, and thread speed degradation.

(2) With transparent SMT, CPU utilization fails to represent the actual capacity use relative to the actual capacity available. For example, in a configuration with 1 executing CPU and 1 waiting CPU, the operating system or application reports 50% CPU utilization. With SMT when that waiting thread starts executing, the hypervisor may provide 50% more capacity (when the hypervisor decides to run the waiting CPU on a core as the only non-waiting thread) or significantly less than 50% more capacity (when the hypervisor decides to run the waiting CPU on a core with other non-waiting threads). To continue meeting existing customer expectations, core utilization must reflect the actual capacity use relative to the actual capacity available as disclosed in embodiments.

(3) Calculating the core capacity gain, thread speed degradation, and core utilization requires taking 2 measurements—one measurement with and without SMT. With System z SMT exploitation, the Millions of Instructions Per Second (MIPS) rating of the machine, core capacity gain, and core utilization determines the customer's monthly bill for software license fees. So, for any workload exploiting SMT on System z, these metrics must be calculable with 1 (a single) SMT measurement according to embodiments.

A multithreading facility may be available on a computer system that implements a supporting architecture. The multithreading facility provides support for multithreading to enable a group of threads, which may also be referred to as CPUs, that share a core. When the multithreading facility is enabled, the CPUs within a core may share certain hardware resources such as execution units or caches. When one CPU in a core is not ready to use hardware resources (typically, while resolving data in the memory nest), other CPUs in the core can utilize the shared core resources rather than have them remain idle. When the multithreading facility is installed and enabled, a thread is synonymous with a CPU that is a member of a core. When the multithreading facility is not installed, or the facility is installed but not enabled, a core comprises a single CPU or thread.

When the multithreading facility is installed, it may be enabled by execution of a set-multithreading signal processor (SIGP) order. In an exemplary embodiment, when the multithreading facility is enabled, the number of CPUs in a configuration is increased by a multiple, the value of which is determined by a program-specified maximum thread identification (PSMTID). The number of CPUs in a core can be one more than the PSMTID. A number of CPUs corresponding to this multiple are grouped into a core. Each core of the same CPU type in a configuration has the same number of CPUs. Each CPU within a core is of the same CPU type; however, based on the model and CPU type, some CPUs within a core may not be operational.

In an exemplary embodiment, a control program, such as an operating system (OS), explicitly enables multithreading in order for it to be usable by the configuration that the OS manages. Alternatively, a hypervisor can enable multithreading and guests of the hypervisor and their applications can benefit transparently. An application program is generally unaware of whether multithreading has been enabled. When multithreading is enabled, the CPU addresses of all CPUs in the configuration are adjusted to include a core identification (or core ID) in the leftmost bits of the address and a thread identification (thread ID, or TID) in the rightmost bits of the address. The core ID may also be referred to as a core address value, and the TID may be referred to as a thread address value. CPUs within a core may share certain hardware facilities such as execution units or lower-level caches, thus execution within one CPU of a core may affect the performance of other CPUs in the core.

In order to manage changes associated with dynamically switching one or more cores of a configuration between single thread and multithreading modes, a number of support features are included. To maintain compatibility with programs that do not support multithreading, a single thread mode may be the default mode upon a reset or deactivation. Exemplary embodiments include features to preserve, communicate, and restore thread context from the multithreading mode to support analysis and/or restoration of the thread context after transitioning from the multithreading mode to the single thread mode.

A computing environment that may be implemented by an exemplary embodiment can be based, for example, on the z/Architecture offered by International Business Machines Corporation, Armonk, N.Y. The z/Architecture is described in an IBM publication entitled, "z/Architecture Principles of Operation," IBM Publication No. SA22-7832-09, August 2012, which is hereby incorporated herein by reference in its entirety. In one example, a computing environment based on the z/Architecture includes an eServer zSeries, offered by International Business Machines Corporation, Armonk, N.Y. A computing environment can include, for example, a processor complex with one or more partitions (e.g., logical partitions) with one or more cores (e.g., processor cores), and one or more levels of hypervisors as further described herein.

FIG. 1 shows a computer system 100 as an example of a computing environment that supports multithreading (MT) according to an embodiment. In FIG. 1, the computer system 100 includes a plurality of hardware processor cores 102, an input/output (I/O) subsystem 104, and system memory 160. The I/O subsystem 104 can provide access to I/O devices known in the art. The processor cores 102, also referred to simply as "cores" or "physical cores" herein, can include processing circuitry with supporting elements. In FIG. 1, cores 102 are depicted as core_1 110, core_2 120, core_3 130, and core_4 140; however, a greater or fewer number of cores 102 is also contemplated. An MT facility 103 may be a hardware component of each of the cores 102. In this example, each of the cores 102 is capable of supporting up to two threads (although three, four, or five threads may be supported in other embodiments). For instance, core_1 110 can support threads 111 and 112. Core_2 120 can support threads 121 and 122. Core_3 130 can support threads 131 and 132. Core_4 140 can support threads 141 and 142. Note that not all threads of each core 102 may be operational at any instant. For example, in core_3 130, thread 131 may be operational/executing while thread 132 is not operational.

FIG. 1 also depicts the system memory 160 of the computer system 100, where parts of the system memory 160 are apportioned to logical partition 1 (LPAR1) 170, LPAR2 180, and LPAR3 190. The LPARs 170, 180, 190 represent virtualized computing systems (also known as configurations) in which an operating system such as Linux or the IBM z/OS™, z/VM, or z/TPF operating system may be executed.

Figure 2A:
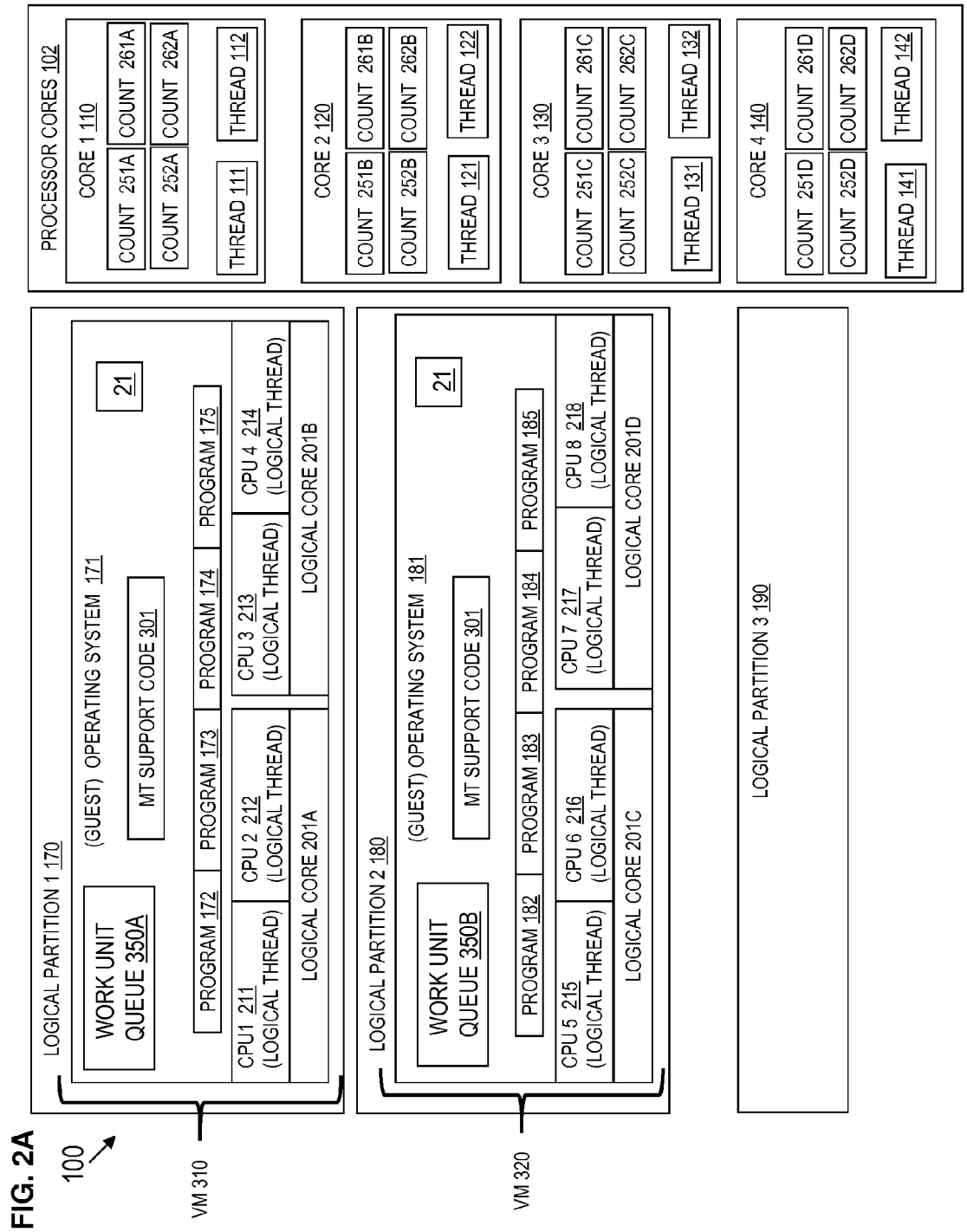
FIGS. 2A and 2B illustrate the computer system with further details of the logical partitions and the hardware processor cores according to an embodiment.
Figure 2B:
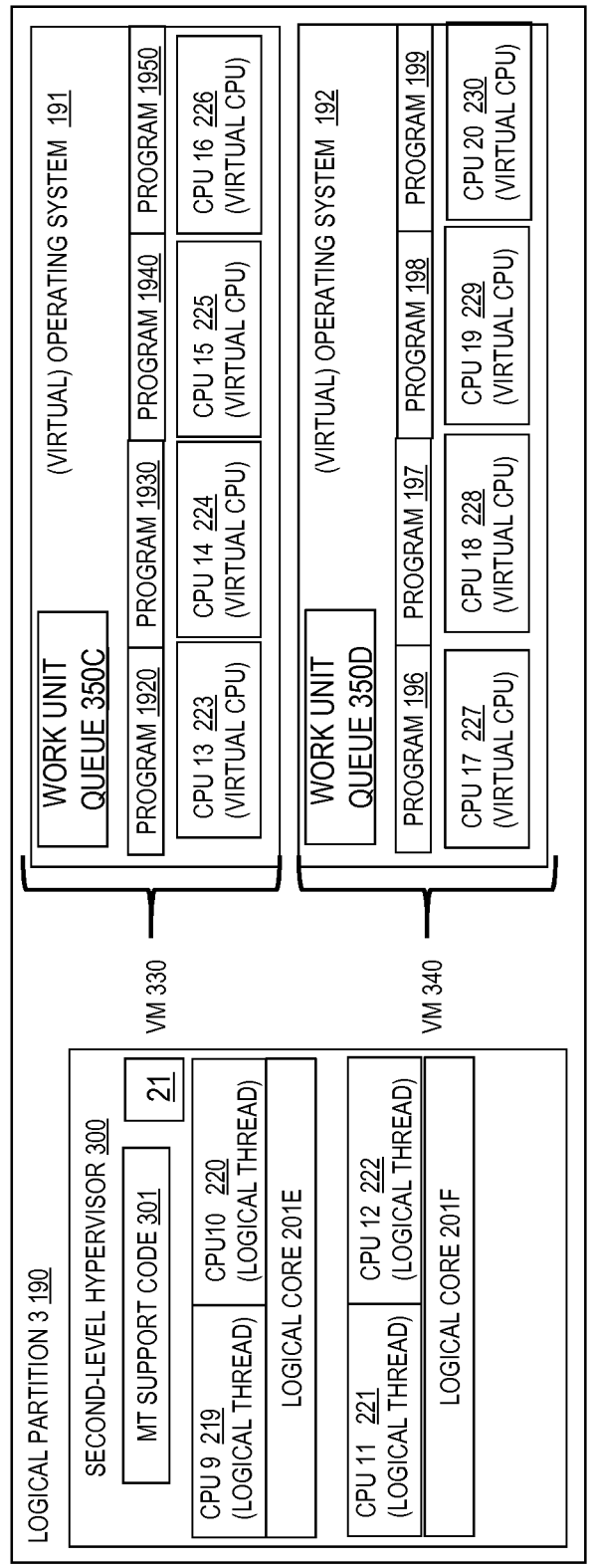

FIGS. 2A and 2B (generally referred to as FIG. 2) shows the computer system 100 with further details of the logical partitions 1, 2, 3 and further details of the hardware processor cores 102 according to an embodiment. Some details of the computer system 100 shown in FIG. 1 are omitted from FIG. 2, so as not to obscure FIG. 2 but the omitted elements are contemplated as part of FIG. 2. In FIG. 2, LPAR1 170 provides processing resources for OS 171 and programs 172, 173, 174, and 175. LPAR2 180 provides processing resources for OS 181 and programs 182, 183, 184, and 185. Referring to FIG. 2B, LPAR3 190 provides processing resources for a second-level Hypervisor 300 and guest OS 191 with programs 1920, 1930, 1940, and 1950 and virtual CPUs 223, 224, 225, and 226 and guest OS 192 with programs 196, 197, 198, 199 and virtual CPUs 227, 228, 229, and 230.

Under control of an operating system executing in an LPAR, programs execute on the logical threads of a logical core. Under control of the second-level hypervisor 300 executing in the LPAR 3, guest operating system virtual CPUs execute on logical threads of a logical core. Subject to the control of an OS, different programs may be dispatched on the same or different threads, subject to dispatching rules and quality-of-service agreements.

Referring back to FIG. 1, also residing in the system memory 160 are various levels of firmware, including for example, Millicode 162 and LPAR hypervisor 163. The Millicode 162 can be embodied as firmware to support lower-level system functions. The LPAR hypervisor 163 may be, for example, licensed internal code such as the IBM Processor-Resource/System Manager™ (PR/SM™). The LPAR hypervisor may also be referred to as the host hypervisor. The LPAR hypervisor 163 can establish the LPARs 170, 180, 190 and may manage dispatching on the hardware processor cores 102. When the MT facility 103 is installed in the computer system 100, the Millicode 162 and LPAR hypervisor 163 also contain MT facility support code 164 and 165 respectively. The MT facility support code 164 and 165 may be considered part of the MT facility 103, as logic to support MT, and the MT facility support code 164 can be distributed between the Millicode 162, LPAR hypervisor 163, and the cores 102. Operating systems 171, 181 include multithreading facility support code to enable and exploit MT in their respective LPARs 170, 180. FIG. 2B depicts second-level hypervisor 300 executing guest operating systems 191, 190 respectively of the computer system 100. The second-level hypervisor 300 for example, the IBM z/VM operating system, includes MT support code 301. The second-level hypervisor 300 respectively provides support for a plurality of virtual machines 330, 340 (also referred to as configurations) in which virtual operating systems 191, 192 operate respectively. The operating systems 171, 181, 191, 192 may include, for example, Linux or the IBM z/OS, z/VM, or z/TPF OS, or may include a guest development environment such as the IBM conversational monitor system (CMS). Note that the second-level hypervisor 300 (having MT support code 301) may be embodied in operating systems 171, 181, 191, 192 respectively.

The virtual machine 310 includes guest OS 171, programs 172, 173, 174, 175 and logical cores 201A and 201B. The guest OS 171 informs the (host) LPAR hypervisor 163 that OS 171 understands the multithreading architecture and creates logical cores and threads according to that architecture. Logical core 201 is configured to support and run two CPUs as logical threads. The logical core 201A supports CPU1 211 as the first logical thread and CPU2 212 as the second logical thread. Logical core 201B supports CPU3 213 as the first logical thread and CPU4 214 as the second logical thread. When a program such as program 172 becomes ready to execute, the operating system 171 dispatches program 172 on an available CPU such as CPU1 (logical thread 211) on logical core 201A. When program 173 becomes ready to execute, the operating system 171 dispatches program 173 on an available CPU such as CPU2 (logical thread 212) on logical core 201A. The LPAR hypervisor 163 then dispatches the entire logical core 201A onto a single physical core 102, such as, for example, onto core 1 110. Core1 110 is configured to execute simultaneous multithreading using two threads which are the threads 111 and 112, such that CPU1 (logical thread 211) executes on physical thread 111 while CPU2 (logical thread 212) executes on physical thread 112. When dispatching a logical core 201 to a physical core 102, the LPAR hypervisor 163 is restricted to the rule that only one logical core 201 is dispatched to a single (hardware) physical core 102 at a time. This means that while logical core 201A is dispatched and executing on core1 110, the logical cores 201B-F cannot be executing on core1 110 (at that same time), and therefore, no logical threads (CPUs) for logical cores 201B-F can execute on the core_1 110 during this time. Since guest OS 171 controls what two logical threads, CPU1 211 and CPU2 212, are assigned to the logical core 201A during multithreading, the guest OS 171 consequently controls physical thread 111 and physical thread 112 executing on physical core_1 110, because the LPAR hypervisor 163 assigns the whole logical core 201A to (exclusively) run on the physical core_1 110 at this point in time. At a later point in time, a different logical core 201 (such as logical core 201D) can be assigned to run on the core_1 110 under the same rule.

The virtual machine 320 includes guest OS 181, programs 182, 183, 184, 185 and logical cores 201C and 201D. The guest OS 181 informs the (host) LPAR hypervisor 163 that OS 181 understands the multithreading architecture and creates logical cores and threads according to that architecture. Logical core 201 is configured to support and run two CPUs as logical threads. The logical core 201C supports CPU5 215 as the first logical thread and CPU6 216 as the second logical thread. Logical core 201D supports CPU7 217 as the first logical thread and CPU8 218 as the second logical thread. When a program such as program 182 becomes ready to execute, the operating system 181 dispatches program 182 on an available CPU such as CPU5 (logical thread 215) on logical core 201C. When program 183 becomes ready to execute, the operating system 181 dispatches program 183 on an available CPU such as CPU6 (logical thread 216) on the same logical core 201C. The LPAR hypervisor 163 then dispatches the entire logical core 201C onto a single physical core 102, such as, for example, onto core2 120. Core2 120 is configured to execute simultaneous multithreading using two threads which are the threads 121 and 122, such that CPU5 (logical thread 215) executes on physical thread 121 while CPU6 (logical thread 216) executes on physical thread 122. Again, when dispatching a logical core 201 to a physical core 102, the LPAR hypervisor 163 is restricted to the rule that only one logical core 201 is dispatched to a single (hardware) physical core 102 at a time. This means that while logical core 201C is dispatched and executing on core2 120, the logical cores 201A, B, D-F cannot be executing on core2 120 (at that same time), and therefore, no logical threads (CPUs) for logical cores 201A, B, D-F can execute on the core2 120 during this time. Since guest OS 181 controls what two logical threads, CPU5 215 and CPU6 216, are assigned to the logical core 201C during multithreading, the guest OS 181 consequently controls physical thread 121 and physical thread 122 executing on physical core2 120, because the LPAR hypervisor 163 assigns the whole logical core 201C to (exclusively) run on the physical core2 120 at this point in time. At a later point in time, a different logical core 201 (such as logical core 201D) can be assigned to run on the core2 120 under the same rule.

Referring to FIG. 2B, the virtual machine 330 includes virtual OS 191, programs 1920, 1930, 1940, 1950, and CPU13 223, CPU14 224, CPU15 225, CPU16 226 as virtual CPUs. The virtual machine 340 includes virtual OS 192, programs 196, 197, 198, 199, and CPU17 227, CPU18 228, CPU19 229, CPU30 230 as virtual CPUs. The virtual machines 330 and 340 are SMT ignorant and consequently do not have any logical cores 201 under the control of their operating systems 191, 192, and the respective CPUs of the operating systems 191, 192 are dispatched onto logical cores 201E and 201F via the second-level hypervisor 300. The hypervisor 300 includes logical core 201E and logical core 201F. Logical cores 201E and 201F are each configured to support and run two CPUs as logical threads. The logical core 201E supports CPU9 219 as the first logical thread and CPU10 220 as the second logical thread. Logical core 201F supports CPU11 221 as the first logical thread and CPU12 222 as the second logical thread. When a program such as program 1920 becomes ready to execute, the virtual operating system 191 dispatches program 192 on an available CPU such as CPU13 (virtual CPU 223). When program 1930 becomes ready to execute, the operating system 191 dispatches program 1930 on an available CPU such as CPU14 (virtual CPU 224). The logical core 201E supports CPU9 219 and CPU10 220, while logical core 201F supports CPU11 221 and CPU12 222. The hypervisor 300 dispatches virtual CPU13 223 onto CPU9 219 of logical core 201E and dispatches CPU14 224 onto CPU10 220 of logical core 201E. Similarly, the hypervisor 300 dispatches CPU17 227 onto CPU11 221 of logical core 201F and dispatches CPU18 228 onto CPU12 222 of logical core 201F.

The LPAR hypervisor 163 then dispatches the entire logical core 201E onto a single physical core 102, such as, for example, onto core3 130. Core3 130 is configured to execute simultaneous multithreading using two threads which are the threads 131 and 132, such that CPU9 (logical thread 219) executes on physical thread 131 while CPU10 (logical thread 220) executes on physical thread 132. Again, when dispatching a logical core 201 to a physical core 102, the LPAR hypervisor 163 is restricted to the rule that only one logical core 201 is dispatched to a single (hardware) physical core 102 at a time. This means that while logical core 201E is dispatched and executing on core3 130, the logical cores 201A-D, F cannot be executing on core3 130 (at that same time), and therefore, no logical threads (CPUs) for logical cores 201A-D, F can execute on the core3 130 during this time. Since the second-level hypervisor 300 controls what two logical threads, CPU9 219 and CPU10 220, are assigned to the logical core 201E during multithreading, the second-level hypervisor 300 consequently controls physical thread 131 and physical thread 132 executing on physical core3 130, because the LPAR hypervisor 163 assigns the whole logical core 201E to (exclusively) run on the physical core3 130 at this point in time. At a later point in time, a different logical core 201 (such as logical core 201D) can be assigned to run on the core3 130 under the same rule.

Guest OS 171, 181 exploit multithreading by dispatching programs to logical CPUs (as logical threads) on logical cores 201 (each logical core 201 can have up to two CPUs (i.e., two logical threads)). Virtual operating systems 191 and 192 dispatches programs to virtual CPUs, and the second-level hypervisor 300 exploits multithreading by dispatching virtual CPUs to logical CPUs (as logical threads) on logical cores 201 (as discussed above with reference to FIG. 2B). This methodology in turn causes the LPAR hypervisor 163 to dispatch (only) one (guest) logical core 201 to (only) one physical core 110, 120, 130, and/or 140 at any given time. The LPAR hypervisor 163 controls which logical cores 201 are dispatched to and/or caused to execute on particular physical cores 102 (to run as respective threads 111, 112, 121, 122, 131, 132, 141, 142), but each guest OS and/or second level hypervisor controls which 1 or 2 logical threads (CPUs) are dispatched onto a logical core 201.

Figure 3:
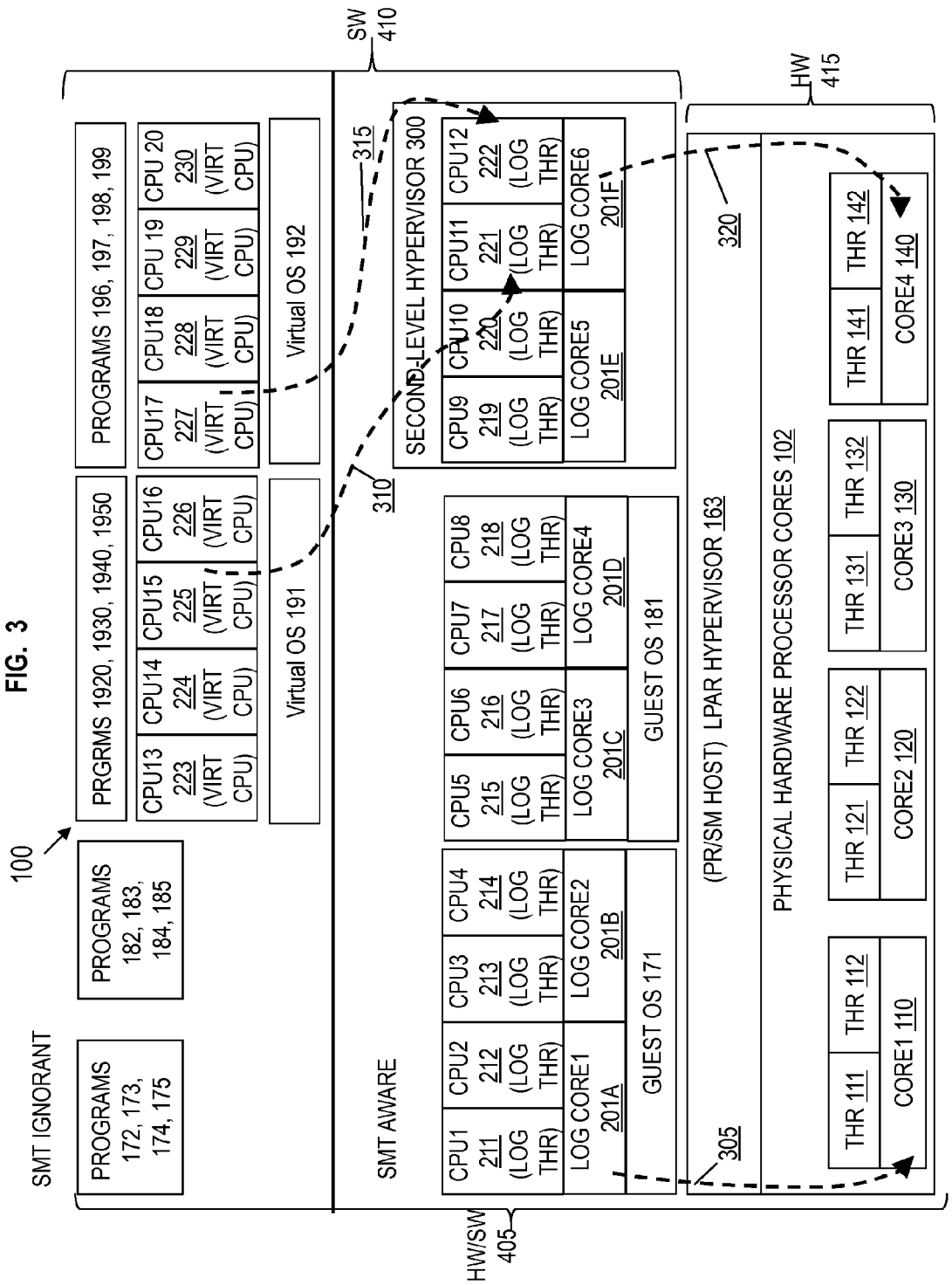
FIG. 3 illustrates a hardware/software (HW/SW) stack of the computer system according to an embodiment.

As a logical view of the hardware and software stack in the computer system 100, FIG. 3 depicts a hardware/software (HW/SW) stack 405 of the computer system 100 according to an embodiment. The HW/SW stack 405 contains SMT awareness to mitigate SMT variability. Hardware provides a Set Multi-Threading interface that second-level hypervisors (like z/VM) 300 and guest operating systems (like z/OS) 171, 181 use to inform the host (PR/SM) hypervisor 163 of the maximum thread id they intend to exploit. The Set Multi-Threading service makes thread id 0 through the maximum thread id available for use, the guest OS and second-level hypervisor create logical cores and threads, and the host (PR/SM) hypervisor 163 begins dispatching guest OS and second-level hypervisor logical cores 201 to physical cores 102.

As noted herein, each guest operating system 171, 181 can dispatch a program to a CPU (up to 2 CPUs/logical threads per logical core) to the respective logical core 102, and the LPAR hypervisor 163 assigns the entire logical core (having two logical thread at most (as two CPUs)) to a physical core. As one example, the guest OS 171 has work (or workloads) from programs 172 and 173 that need to execute as two separate instruction streams. The guest OS 171 assigns one instruction stream to CPU1 211 (as the first logical thread) and the other instruction stream to CPU2 212 (as the second logical thread). The host (LPAR) hypervisor 163 detects that guest OS 171 logical core1 201A (with its two logical threads) is ready. The host hypervisor 163 places (executes, runs, assigns) the entire logical core1 201A to physical core1 110 to execute, such that CPU1 211 (first logical thread) is executed/loaded as thread 111 and CPU2 212 (second logical thread) is executed/loaded as thread 112 on the physical core1 110. In FIG. 3, the dashed line 305 shows that virtual core1 201A is executing on core1 110. Since the OS 171 controls what work is assigned to CPU1 211 (first logical thread) and CPU2 212 (second logical thread) on logical core1 201A and since the host hypervisor 163 is required to execute an entire logical core 201 (which is the logical core 201A in this example) on the core1 110 (in this example), the OS 171 (having MT awareness, i.e., knowing that the OS has more than 1 logical thread to a logical core 201) has de facto control over the physical core1 110 for the period of time when the host hypervisor 163 has assigned one of the processor cores 102 to the logical core 201A). The host hypervisor 163 can assign logical core1 201A to any of the cores 102, and core1 110 is discussed for explanation purposes.

Referring to FIG. 3, each virtual operating system 191 and 192 can dispatch a program to a virtual CPU and the second-level hypervisor 300 dispatches virtual CPUs to logical threads. As one example, the virtual OS 191 has work from program 1950 and dispatches that work unit to virtual CPU15 225 and virtual OS 192 has work from program 196 and dispatches that work on to virtual CPU17 227. The second-level hypervisor detects that virtual CPU15 225 and virtual CPU17 227 are ready and dispatches the virtual CPU15 225 to CPU11 211 (as the first logical thread) and virtual CPU17 227 to CPU12 222 (as the second logical thread) on logical core 201F as the dashed lines 310 and 315 illustrate. The algorithms of the second-level hypervisor 300 and OS 171, 181 must steer cores to execute with a high thread density. The host hypervisor 163 places (executes, runs, assigns) the entire logical core 201F to physical core4 140 to execute, such that CPU11 221 (first logical thread) is executed/loaded as thread 141 and CPU12 222 (second logical thread) is executed/loaded as thread 142 on the physical core4 140, as shown by dashed line 320. The host hypervisor 163 can assign logical core4 201F to any of the cores 102, and core4 140 is discussed for explanation purposes.

Hardware Core Counter Instrumentation

In an SMT environment, a waiting thread is a thread that has not been dispatched with work such that the waiting thread is ready to be assigned work (i.e., a stream of instructions) and then execute. A core is waiting when all its threads are waiting. A non-waiting thread embodies one of the following states: executing instructions, competing to execute instructions, and/or resolving a cache miss. A core is non-waiting when 1 or more of its threads are non-waiting. A physical or logical core's thread density (such as physical core1 110 or logical core1 201A) represents the number of non-waiting threads at a given time for that physical or logical core. In the example, physical cores 102 and logical cores 201A-F can have a maximum of two threads each. A thread density 2 core contains 2 non-waiting threads, which means, for physical core 110 and logical core 201A that both physical threads 121 and 122 and logical threads 211 and 212, respectively, are executing. A thread density 1 core contains 1 non-waiting thread and 1 waiting thread (for any physical core such as core1 110 or logical core such as core1 201A). For example, when physical core 120 has a thread density 1, this means that one thread such as thread 121 is non-waiting (e.g., executing on the core 120) and the other thread such as thread 122 is waiting (e.g., not executing work on the core 120). This also means physical core 120 is executing a logical core, such as logical core3 201C operating at thread density 1 with logical thread 215 non-waiting and logical thread 216 waiting.

With reference to FIG. 2, each of the processor cores 102 (such as in System z) contain core counters 251, 261, 252, 262 for counting the number of core cycles and the number of core instructions at each thread density. For example, SMT hardware (such as System z SMT hardware) that supports 2 threads per core (SMT-2) contains the following core counters:

1) core cycle counters 251A, 251B, 251C, 251D (generally referred to as core cycle counters 251) each count core cycles operating at thread density 1 (C_1) for their respective cores 110, 120, 130, 140.

2) core instruction counters 261A, 261B, 261C, 261D (generally referred to as core instruction counters 261) each count core instructions complete at thread density 1 (I_1) for their respective cores 110, 120, 130, 140.

3) core cycle counters 252A, 252B, 252C, 252D (generally referred to as core cycle counters 252) each count core cycles operating at thread density 2 (C_2) for their respective cores 110, 120, 130, 140.

4) core instruction counters 262A, 262B, 262C, 262D (generally referred to as core instruction counters 262) each count core instructions complete at thread density 2 (I_2) for their respective cores 110, 120, 130, 140.

For every clock cycle the core (e.g., cores 110, 120, 130, 140) executes, the number of non-waiting threads determines whether the core cycle counter at thread density 1 (e.g., respective core cycle counter 251) or thread density 2 (e.g., respective core cycle counter 252) increments by 1. For example, for each clock cycle, the core cycle counter 251B increments by 1 for each cycle core 120 executes at thread density 1 (e.g., with a single non-waiting thread such as thread 121 or 122 but not both). For each clock cycle, the core cycle counter 252B increments by 1 for each cycle core 120 executes at thread density 2 (e.g., when both threads 121 and 122 are non-waiting on core 120).

Any instruction(s) that complete during a core cycle increment the core instruction count at the appropriate thread density. The clock cycle is the time between two adjacent pulses of the oscillator that sets the tempo of the computer processors (e.g., cores 110, 120, 130, 140). For example, for each clock cycle, the core instruction counter 261B increments by 1 for each time the core 120 completes execution of an instruction at thread density 1 (e.g., executes an instruction with a single non-waiting thread such as thread 121 or 122 but not both). For each clock cycle, the core instruction counter 262B increments by 1 for each time the core 120 completes execution of an instruction at thread density 2 (e.g., when both threads 121 and 122 are non-waiting).

For all state-of-the-art hardware platforms in the industry, cycle and instruction counts exist only on a thread basis. On such hardware, while a thread is executing (non-waiting) the thread cycle count increments with respect to the core frequency (clock speed) and the thread instruction count increments when each instruction completes. The industry thread counters provide no insight into the frequency the thread executes at thread density 1 (full access to the core resource at the maximum thread speed) or at thread density 2 (shared access with a workload dependent core capacity gain and thread speed degradation). At runtime the thread counters do not provide sufficient information to calculate capacity planning metrics including core capacity gains, core capacity utilization, and remaining core capacity available. However, according to embodiments, the processor cores 110, 120, 130, 140 in computer system 100 (such as a System z cores) contain core cycle and core instruction counts (via core cycle counters 251 and 252 and core instruction counters 261 and 262) at each thread density (both thread density 1 and 2) in addition to the industry's thread cycle and thread instruction counts. The individual core cycle and core instruction counts for each of the processor cores 102 may be stored in a database 10 in the system memory 160 of the computer system 100 (shown in FIG. 1).

The core counter instrumentation provides the insights into SMT execution on the physical cores 110, 120, 130, 140 to calculate all capacity planning metrics and core utilization with respect to capacity measurement, as discussed further herein.

Hypervisor and Operating System Core Virtualization: Second-level hypervisor 300 (such as z/VM) and/or operating systems 171, 181 (such as z/OS) exploiting SMT receive control over all logical threads (e.g., CPU 211, 212, 213, 214, 215, 216, 217, 218, 219, 220, 221, 222) on each logical/virtual core 201A, 201B, 201C, 201D, 201E, 201F. Virtual operating systems 191 and 192 are SMT ignorant, so the second-level hypervisor 300 is responsible for managing the SMT environment.

The SMT responsibilities of guest OS 171, 181 and second-level hypervisor 300 are to operate each logical core 201 with a high thread density (i.e., with 2 executing logical threads because physical cores 102 and logical cores 201 support 2 threads) to achieve a high core capacity gain. For example, the operating system 171 is implemented to run the logical core 201A with both CPUs 211 and 212 (i.e., two logical threads) instead of only 1 CPU 211 (if possible). The SMT responsibilities executed by the guest OS 171, 181, and second-level hypervisor 300 must satisfy the customer workload performance goals with the fewest number of logical cores 201 possible to practice good virtualization citizenship (this maximizes the number of physical cores 102 available for other guests because the host hypervisor 163 assigns a whole logical core 201 to a physical core 102, such that no other logical core 201 can simultaneously use that particular physical core). Adhering to (honoring) these SMT responsibilities uses physical core resources efficiently and provides guest operating systems and second-level hypervisors the framework necessary to deliver its workload a repeatable core capacity gain, thread speed degradation, response time, and latency. The operating systems 171, 181 and second-level hypervisor 300 each separately implement algorithms that satisfy the SMT responsibilities discussed herein. Algorithmically, the implementation satisfies these responsibilities with the following design points as discussed below (further discussed in FIGS. 4 and 5).

When new work arrives into the operating system, the guest OS 171, 181, and/or second-level hypervisor 300 follow a "fill-and-spill" model for finding a waiting logical thread to dispatch new work. On guest OS 171, 181 "new work" means a program such as 172 became ready to run and on second-level hypervisor 300 "new work" means a virtual CPU such as virtual CPU15 became ready to run because virtual OS 191 dispatched a ready program like 1940 to virtual CPU 15. The "fill" component involves guest operating systems and/or second-level hypervisor steering new work to a waiting logical thread on a running logical core. A running logical core is a logical core 201 with a thread density of at least 1. When no candidates (i.e., no active logical core under the control of the particular operation system and/or second-level hypervisor) exist to satisfy the "fill" component, the guest operating system/second-level hypervisor may "spill" or steer new work to a waiting logical thread on a waiting logical core. A waiting logical core is a logical core with all its threads in a wait (e.g., both CPUs in a wait). When a thread finds no work ready to dispatch, that thread loads a wait (i.e., becomes a waiting thread). Work unit queues (e.g., respective work unit queues 350A, 350B, 350C, 350D on respective operating systems 171, 181, 191, 192) empty randomly, so random logical threads on random logical cores 201 load a wait. Over time, this can cause guest operating systems to neglect their SMT responsibilities to run logical cores with a high thread density. Guests adhere to (honor) their SMT responsibilities despite threads randomly loading a wait using by implementing a contract algorithm. On a regular interval (e.g., 400 microseconds) for each work unit queue 350, the contract algorithm (individually implemented in each operating system 171, 181 and second-level hypervisor 300) counts the number of waiting threads on running logical cores (waiting logical threads on cores with a thread density greater than or equal to 1). If the number of waiting logical threads on running logical cores 201 in an operating system and/or second-level hypervisor exceeds the contract threshold (e.g., the contract threshold may be at least 2 waiting threads on running logical cores 201A and 201B in the operating system 171 which is the minimum number of waiting threads to yield a waiting core), the operating system and/or second-level hypervisor marks the best candidate running logical core (e.g., the candidate running logical core with the most waiting logical threads and/or when both logical cores have the same amount of waiting logical threads, the operating system selects one of the logical cores) to contract (i.e., to reduce). That is, the operating system and/or second-level hypervisor selects the best candidate logical core to contract such as 201A and marks it for contraction.

In the dispatcher of the operating system (OS 171, 181) and/or second-level hypervisor, when a thread detects that the logical core 201 it belongs to must contract, the thread loads a wait (via the operating system and/or second-level hypervisor). Via the operating system and/or second-level hypervisor, the last thread contracting (on a logical core) marks the virtual core contraction process as complete and then loads a wait.

Figure 4:
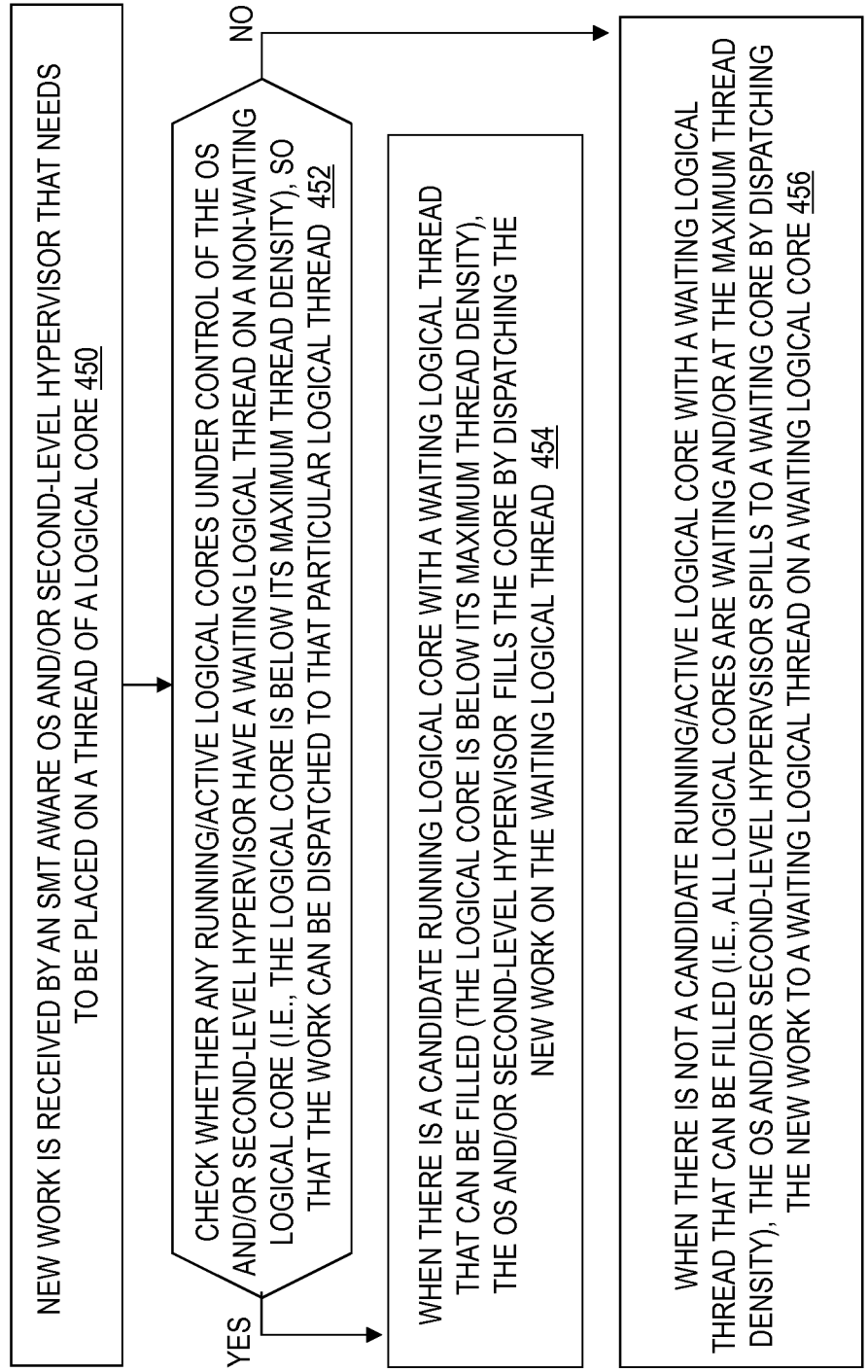
FIG. 4 illustrates a flow chart for dispatching threads onto logical cores as respectively executed by each operating system according to an embodiment.

FIG. 4 depicts a flow chart 400 for dispatching threads onto the virtual cores 201 (using the "fill-and-spill" model/algorithm) as respectively executed by each operating systems 171, 181 and second-level hypervisor 300 according to an embodiment. The operating systems 171, 181 and second-level hypervisor 300 are multithreading aware, know which logical threads belong to each logical core 201, and know where each logical core (and all logical threads) execute on the physical core 102. Note that examples are provided utilizing the guest operating system 171 in the virtual machine 310 for ease of understanding, but the description applies by analogy to all the operating systems 171, 181 and second-level hypervisor 300 and their respective virtual machines 310, 320, 330, 340.

At block 450, guest OS 171 receives new work (from, e.g., programs 172, 173, 174, and/or 175) that needs to be placed on one of the threads (211, 212, 213, 214) of one of the virtual cores 201A and/or 201B. The OS 171 is configured to check whether any running/active logical cores 201A and/or 201B under control of the OS 171 have a waiting logical thread (i.e., the logical core is not at its maximum thread density), so that the waiting thread may be assigned/dispatched to the particular logical core 201, at block 452. In one case, it is assumed that both logical cores 201A and 201B are active and running without waiting threads (i.e., both logical cores are at the maximum thread density).

When OS 171 determines that (YES) there is a candidate running logical core (such as logical core 201A) with a waiting logical thread (i.e., the logical core 201A is not at its maximum thread density 2 and has waiting thread/CPU 212), the OS 171 selects and fills the candidate running virtual core 201A by dispatching the new work (i.e., programs) on the waiting thread (e.g., thread/CPU2) assigned to the candidate logical core at block 454. In this case, assume that the CPU1 211 (first logical thread) is not waiting (i.e., active/executing) and the CPU_2 212 (second logical thread) is the waiting thread on the logical core 201A. The OS 171 dispatches the new work on the waiting logical thread/CPU 212 such that the waiting logical thread/CPU 212 now becomes non-waiting (i.e., executing).

When OS 171 determines that (NO) there is not a candidate running logical core with a waiting thread that can be filled (i.e., this means that the logical cores 201A and 201B are both at their maximum thread density 2, one logical core is at its maximum thread density 2 and the other logical core is waiting, and/or both logical cores 201A and 201B are waiting (not active)), the OS 171 spills by steering the new work to a waiting thread on a waiting logical core (i.e., the new work (instructions) is placed on a waiting thread on a waiting logical core), at block 456. For example, the OS 171 determines that the logical core 201A is at its maximum thread density 2 and determines that the logical core 201B is a waiting logical core (i.e., the logical core 201B has two waiting threads/CPUs 213 and 214). Then, the OS 171 spills and selects the waiting logical core 201B and places the new work on a waiting logical thread, e.g., logical thread/CPU 213 of the logical core 201B, which changes logical core 201B from waiting to active/running.

Note also that, at block 450, second-level hypervisor 300 receives new work (from, e.g., virtual CPUs 223, 224, 225, 226, 227, 228, 229, 230) that needs to be dispatched on one of the logical threads (219, 220, 221, 222) of one of the logical cores 201E and/or 201F. The second-level hypervisor 300 uses an analogous fill-and-spill technique to dispatch the new work.

Figure 5:
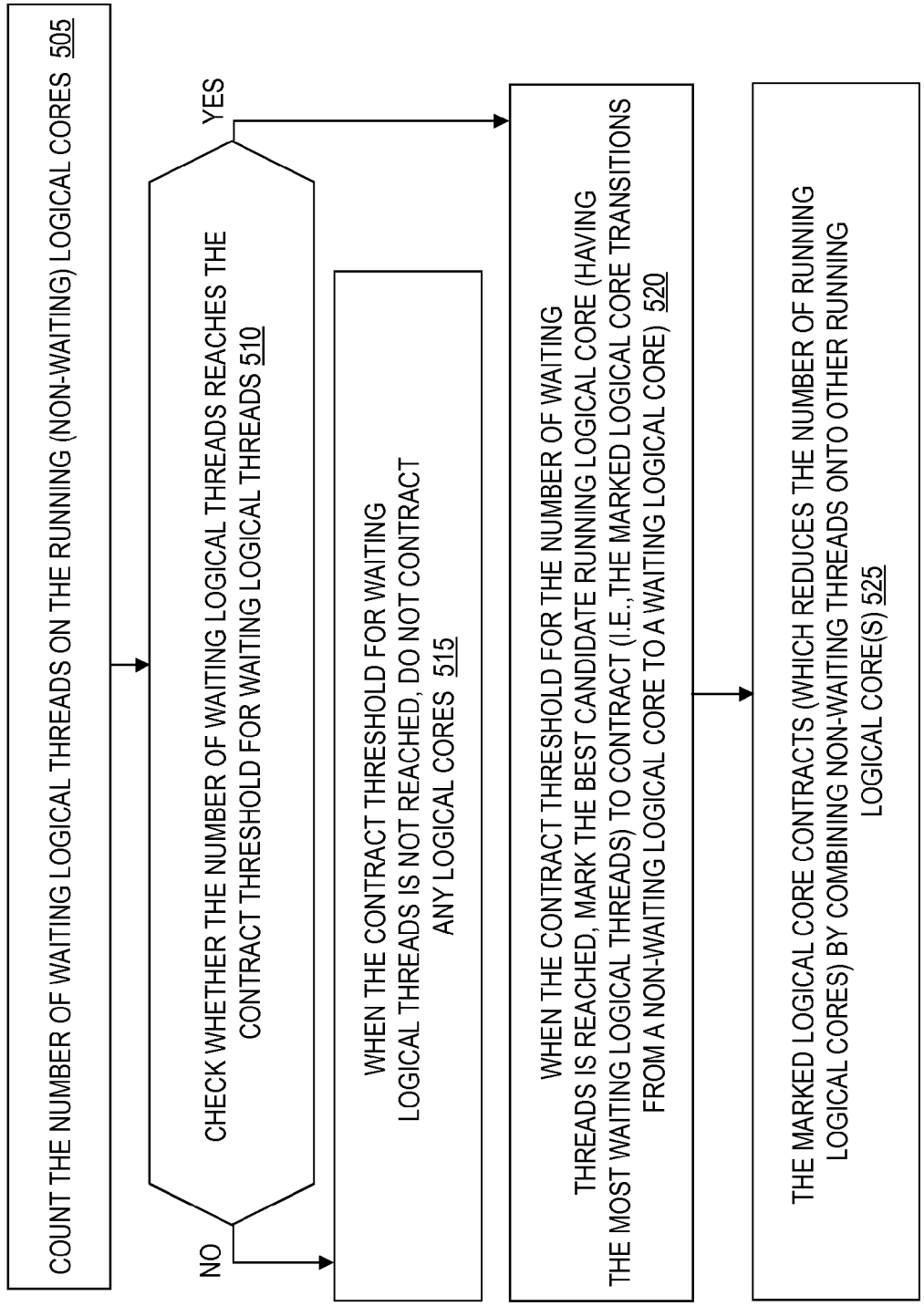
FIG. 5 illustrates a flow chart for implementing the contract algorithm as respectively executed by each operating system according to an embodiment.

FIG. 5 depicts a flow chart 500 for implementing the contract algorithm as respectively executed by each operating system 171, 181 and second-level hypervisor 300 according to an embodiment. Again, note that examples are provided utilizing the operating system 171 in the virtual machine 310 for ease of understanding, but the description applies by analogy to all the operating systems 171, 181 and second level hypervisor 300 and their respective virtual machines 310, 320, 330, 340.

To ensure that each of the virtual cores 201A and 201B under control of the operating system 171 run at a high thread density (e.g., thread density 2), the operating system 171 counts the number of waiting threads on the running (non-waiting) logical cores 201A and 201B, at block 505. Assume in one case that the OS 171 finds 2 waiting threads, which in this case is one waiting logical thread/CPU 211 on running logical core 201A and one waiting logical thread/CPU 213 on running logical core 201B.

At block 510, the OS 171 checks whether the number of waiting threads, which is 2 waiting threads in this example, reaches the contract threshold for waiting threads (e.g., the minimum contract threshold is 2 waiting threads) on running logical cores 201A and 201B. Suppose the OS 171 controlled one or more other logical cores that were in a waiting state (i.e., not running), the OS 171 would not count any waiting threads on these waiting logical cores because the waiting logical cores are not running and therefore not executing on any physical cores 102 (i.e., not any physical cores 110, 120, 130, 140).

At block 515, when the OS 171 determines that the contract threshold for waiting threads is not reached (e.g., assume that the number of waiting threads is 1 waiting thread but the contract threshold is 2 waiting threads), the OS 171 does nothing and does not contract logical core 201A or 201B (i.e., does not reduce the number of running logical cores in the OS 171). For block 515, assume that the OS 171 only found 1 waiting thread between the two logical cores 201A and 201B, and the OS 171 did not fulfill the minimum contract threshold of 2 waiting logical threads/CPUs, then the OS 171 would not contract any logical cores.

However, at block 520, when the OS 171 determines that the contract threshold for the number of waiting threads is reached/met, the OS 171 marks the best candidate running logical core (having the most waiting logical threads) to contract (i.e., the marked logical core transitions from a non-waiting logical core to a waiting logical core). If the logical cores 201A and 201B each have the same number of waiting threads, the OS 171 can mark either logical core, such as logical core 201B, as the candidate to contract.

At block 525, the OS 171 contracts (which reduces the number of running logical cores) logical core 201B (i.e., the marked logical core) by combining non-waiting threads from logical core 201B onto one or more other logical cores, e.g., onto logical core 201A, and putting the contracting logical core 201B in a waiting state. For example, when the OS 171 finds 2 waiting logical threads (waiting logical thread/CPU 211 on running logical core 201A and waiting logical thread/CPU 213 on running logical core 201B), this means that OS 171 determines that the logical core 201A has non-waiting logical thread/CPU 212 and the logical core 201B has non-waiting logical thread/CPU 214. The OS 171 combines the two non-waiting logical threads CPU 212 and 214 by placing/executing both of the non-waiting logical threads CPU 212 and 214 onto the single logical core 201A, which means the workload of logical thread/CPU 214 is moved to waiting logical thread/CPU 211; this contraction by the OS 171 results in logical putting logical core 201B into a wait by loading logical threads/CPUs 213 and 214 with a wait. Accordingly, the running logical cores of OS 171 have contracted from two running logical cores to just one running logical core 201A (with two running threads) and one waiting logical core 201B (with two waiting threads). Since only running logical cores 201 (i.e., non-waiting logical cores) are dispatched/executed on physical cores 102, the logical core 201A is the only logical core (under control of OS 171) dispatched to (executing on) one of the physical cores 102. The second-level hypervisor 300 uses an analogous contract technique as discussed herein.

Capacity Planning Using Core Counter Instrumentation

The hypervisor 300 (like z/VM) and operating system 171, 181 (like z/OS) calculate capacity planning metrics over a time interval (e.g., ranging from multiple seconds to one minute) by using counters 251, 252, 261, 262. In one embodiment, a metric application 21 may be included in and/or integrated in the second-level hypervisor 300 and operating systems 171, 181 and hardware itself such as hardware controller 50 (application specific integrated circuit) (with a scope for the overall system or on a per second-level hypervisor or operating system basis) to perform features discussed herein. Examples may refer to calculations by the metric application 21, but it is contemplated that the hypervisor 300 and the operating systems 171, 181 and hardware itself can be configured to perform the same calculations. A general processor 30 (e.g., with one or more processor cores) may be utilized to execute general functions of the computer system 100, while the processor cores 102 are utilized by virtual machines in logical partitions 170, 180, 190. The hardware system area 161, including millicode 162 and LPAR hypervisor, and the metric application 21 execute on the processor 30.

The SMT runtime capacity planning metrics below illustrate the calculations for a workload exploiting simultaneous multithreading with 2 threads per core (SMT-2 core) for ease of understanding. Similar methodology applies for simultaneous multithreading with any number of threads per core 102. For SMT-2 cores, the metric application 21 (i.e., second-level hypervisor 300 and operating systems 171, 181 each) calculates and stores deltas (the number of counts) for each the following core counters per physical core 110, 120, 130, 140:

core cycles operating at thread density 1 (C_1) via each core cycle counter 251A, 251B, 251C, 251D;

core instructions complete at thread density 1 (I_1) via each core instructions counter 261A, 261B, 261C, 261D;

core cycles operating at thread density 2 (C_2) via each core cycle counter 252A, 252B, 252C, 252D; and core instructions complete at thread density 2 (I_2) via each core instructions counter 262A, 262B, 262C, 262D.

Note that the PR/SM host hypervisor 163 virtualizes the physical core counters to the second-level hypervisor and OS. When PR/SM hypervisor 163 undispatches a logical core from a physical core, the hypervisor 163 saves the hardware core total count C_1, I_1, C_2, I_2; when PR/SM hypervisor 163 dispatches the logical core to a physical core, the hypervisor 163 restores the hardware core total count C_1, I_1, C_2, I_2. So when a second-level hypervisor and/or OS is doing the delta math for the core counters, the core total count C_1, I_1, C_2, I_2 really represents the deltas of each logical core 201.

The LPAR hypervisor 163 individually identifies and stores in the database 10 each time a logical core 201 is dispatched to execute on a respective physical core 110, 120, 130, 140, along with a time stamp for the start and stop time. The database 10 can be realized as (include) the hardware data state associated with each logical core that is saved/restored on an undispatch/redispatch. The data being saved/restored is the total time the logical core that executed was dispatched to a physical core, and the core counters. The database 10 includes the identification of the logical core 201A (such as logical core 201A in OS 171), identification of the processor core 102 that the logical core 201 was run on, and the length of time the logical core 201 executed on that particular processor core 102 (e.g., logical core 201A executed on core physical 110 for 2 minutes), along with the counter information from each respective counter 251, 252, 261, 262 per physical core 110, 120, 130, 140. Assume that a customer has paid for a logical partition, such as the logical partition 1 170 having virtual machine 310 and OS 171, and assume metrics are needed to determine whether simultaneous multithreading is benefiting the customer, and if so, how. The metric application 21 obtains the collected data in database 10 for logical partition 1 of OS 171 having control of logical core 201A and 201B, and obtains how logical cores 201A and 201B were executed on respective cores 110, 120, 130, 140 with one thread and/or two threads, along with the length of time. The metric application 21 combines the data related to the various execution times and core counter deltas for logical cores 201A and 201B under control of the OS 171 for the customer. Although examples utilize logical partition 1 170 with OS 171 and logical cores 201A and 201B, the metric application 21 is configured to obtain execution times and core counter deltas for each logical partition 170, 180, 190 having its own operating system and/or second-level hypervisor and logical cores 201, and then perform calculations discussed herein. Note that the various calculations using formulae disclosed herein are described on an individual core basis but are also applicable to the sum of core counter deltas across multiple cores.

When a core contains a sufficient sample (sufficient instruction and cycle core counter deltas at each thread density, which may be predetermined) corresponding to a customer's logical partition (such as logical partition 1 170 for OS 171 with logical cores 201A, 201B), the deltas are a workload representative sample at each thread density. These deltas enable the metric application 21 to calculate of the average: Instructions Per Cycle (IPC) at a core scope for any thread density for the overall workload of each guest OS and second-level hypervisor, where the instruction per cycle (IPC) at thread density 1 is $IPC\_1 = I\_1/C\_1$ and where the instruction per cycle (IPC) at thread density 2 is $IPC\_2 = I\_2/C\_2$. Core counter deltas and statistical averages form the building blocks for all capacity planning metrics calculated by the metric application 21 below. Again, note that examples are provided for processor cores 102 with a maximum thread density 2, but is it contemplated that the calculations may be performed for higher thread densities with any maximum.

SMT-2 Runtime Maximum Capacity

Via metric application 21, the SMT-2 runtime maximum capacity metric requires a sufficient sample (which may be predetermined/predefined) at thread density 2 and 1. Via metric application 21, the SMT-2 runtime maximum capacity metric calculates on average how much work a logical core 201 completes at thread density 2 versus thread density 1 and consists of the following formula: SMT-2 Runtime Maximum Capacity=$(IPC\_2)/(IPC\_1)$.

FIG. 7 illustrates a graph 700 of the concepts in calculating runtime maximum capacity (which may be calculated by the metric application 21) according to an embodiment. The x-axis represents the total time a logical core operates at thread density 2 and thread density 1. For example, if the logical cores represent 201A and 201B, bar 705 shows at thread density 1, and the runtime maximum capacity of logical cores 201A and 201B is 1.0 (100%) because the cores are completing as much work as they can complete. At thread density 2, the runtime maximum capacity (shown as bar 710) is workload dependent because the capacity gain from SMT is workload dependent. With a sufficient sample over the interval, the metric application 21 calculates the runtime maximum capacity factor by comparing on average how much work the core completes at thread density 2 (IPC_2) versus how much work the core completes at thread density 1 (IPC_1). Workloads that receive a capacity gain from MT will have a runtime maximum capacity range of 1.0 to 1.5.

SMT-2 Runtime Productivity

FIG. 8 illustrates a graph 800 of the concepts in calculating runtime productivity (which may be calculated by the metric application 21) according to an embodiment. The x-axis represents the total time logical cores operate at thread density 2 and thread density 1. When SMT-2 logical cores operate at thread density 2, on average the logical cores achieve the SMT-2 Runtime Maximum Capacity (e.g., 1.x). When an SMT-2 logical core operates at thread density 1 (shown as bar 805), additional core capacity exists (shown as box 815), but how much depends on the number of logical core cycles at thread density 1 and how many more instructions could execute at thread density 2 on average. The SMT-2 Runtime Productivity metric brings these concepts together as a ratio of how many instructions the physical core executes, over how many instructions the physical core would execute with all core cycles operating at thread density 2 on average. Via the metric application 21, the SMT-2 Runtime Productivity metric requires a sufficient workload representative sample at thread density 2 (shown as bar 810) and consists of the following formula: SMT-2 Runtime Productivity=$(I\_1+I\_2)/[IPC\_2*(C\_1+C\_2)]$.

SMT-2 Runtime Utilization:

FIG. 9 illustrates a graph 900 of the concepts in calculating effective runtime utilization (which may be calculated by the metric application 21) according to an embodiment. The x-axis shows the core execution time for equal units of time. The left side of the y-axis shows runtime maximum capacity from 0 to the Runtime Maximum Capacity (1.x) for logical thread 1 (e.g., logical thread 211 on logical core 201A) and the right side of the y-axis shows the runtime maximum capacity for logical thread 2 (e.g., logical thread 212 on logical core 201B) in the reverse order from the Runtime Maximum Capacity (1.x) to 0. The free capacity is shown as blocks of free capacity with the dotted pattern. The SMT-2 Runtime Utilization quantifies the effective SMT-2 capacity use by converting the core use (a mixture of core cycles at thread density 1 and 2) into effective core use at thread density 2. SMT-2 Runtime Productivity represents the number of instructions completed at thread density 1 and 2 relative to the total instructions that could complete had the core always operated at thread density 2 on average. So the product of the core use and the SMT-2 Runtime Productivity determines the SMT-2 Runtime Utilization. Via metric application 21, SMT-2 Runtime Utilization requires a sufficient workload representative sample at thread density 2 and consists of the following formula: SMT-2 Runtime Utilization=$(C\_1+C\_2)*(SMT\text{-}2$ Runtime Productivity).

FIG. 10 illustrates a graph 1000 of runtime utilization and runtime available capacity (which may be calculated by the metric application 21) according to an embodiment. For bar 1005, the x-axis shows the core busy time at runtime maximum capacity for equal units of time. For bar 1010, the x-axis shows the capacity free (units) at runtime maximum capacity for the same equal units of time. The y-axis shows the runtime maximum capacity for thread density 2.

SMT-2 Runtime Available Capacity

SMT-2 Runtime Available Capacity measures how much more SMT-2 capacity the logical core contains. Additional available core capacity (shown as bar 1010) exists when a logical core is in a wait (both threads are waiting) and a logical core operates at thread density 1. SMT-2 Runtime Available Capacity requires a sufficient workload representative sample (which may be predetermined/predefined) at thread density 1 and 2 and consists of the following formula: SMT-2 Runtime Available Capacity=[(Interval)−(SMT-2 Runtime Utilization)]*(SMT-2 Runtime Maximum Capacity). The interval is the total length of time that elapsed during the predetermined workload representative sample.

Each of the counters 251, 252, 261, 262 include counters and/or timers to support system time-base generation and diagnostic actions. For example, the counters and/or timers may be used to support time-of-day, as well as various diagnostic and measurement facilities.

Figure 6:
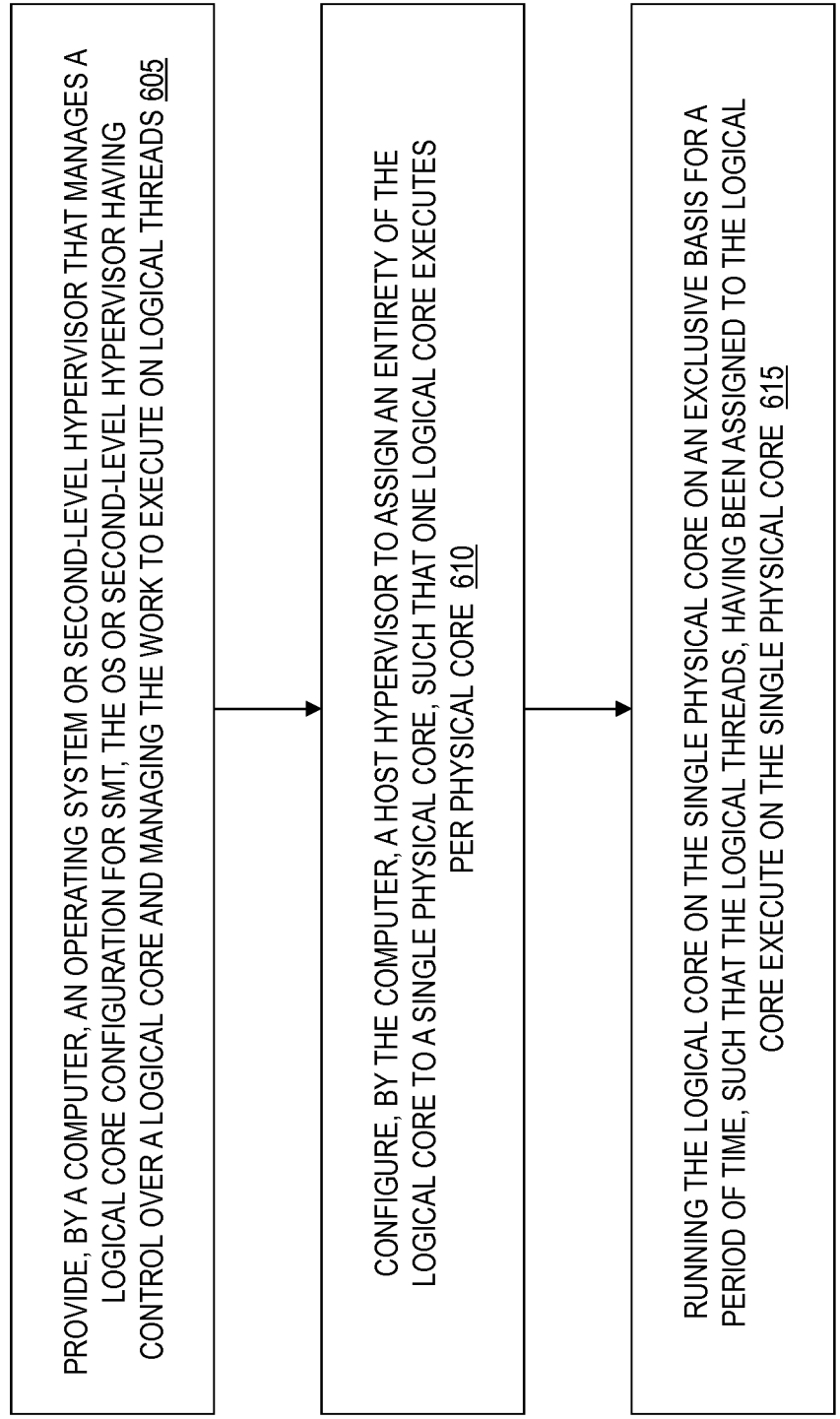
FIG. 6 illustrates a method for simultaneous multithreading (SMT) by the computer system according to an embodiment.

Now turning to FIG. 6, a method 600 is illustrated for simultaneous multithreading (SMT) by the computer system 100 according to an embodiment.

The computer system 100 provides operating systems 171, 181 and second-level hypervisor 300 that manage a virtual core configuration (2 logical cores) for simultaneous multithreading, where the operating system and second-level hypervisor have control over a logical core and each logical thread on each logical core (e.g., what work is loaded onto a logical thread/CPU), at block 605.

At block 610, the computer system 100 includes the host (LPAR) hypervisor 163 configured to assign an entirety of the logical core (e.g., all logical threads/CPUs 211 and 212 of logical core 201A) to a single physical core (e.g., logical core 201A may be assigned to physical core 110), such that one logical core executes per physical core on the processor cores 102. For example, the host hypervisor 163 cannot assign both logical thread/CPU 211 (of logical core 201A) and logical thread/CPU 213 (of logical core 201B) to physical core 110, because an entire logical core 201 (only one) must be assigned/dispatched to physical core 110, and the logical threads from more than one logical core 201 cannot be assigned to the same physical core 110.

At block 615, the computer system 100 runs the logical core (logical core 201A) on the single physical core (physical core 110) on an exclusive basis for a period of time (X amount of microseconds which is until the time slice expires and/or corresponding work units (i.e., work, workload, etc.) in work unit queue 350A is completed). For example, the logical core 201A may be dispatched by the host hypervisor 163 to the physical core 110 for X amount of seconds or X amount of microseconds, while no other logical core 201 can be dispatched to the physical core 110.

The host hypervisor 163 assigns one entire logical core 201 (e.g., logical core 201A) to one physical core 102, such as core 110, at a time for the exclusive basis to perform simultaneous multithreading.

The workload (i.e., work units from work unit queue 350A) of what the single physical core 110 is executing is restricted back (corresponds) to the logical threads/CPUs 211 and 212 on logical core 201A. The operating system 171 manages the logical core 201A and at least another logical core 201B (in one case there could be 3, 4, 5, etc., additional logical cores under the control of the OS 171) as the logical core configuration. The operating system 171 places new work (from work unit queue 350A) on non-waiting logical cores that have a waiting thread available before placing work on waiting logical cores as discussed in FIG. 4.

The operating system 171 determines that a contract threshold is met for a total number of waiting threads on the logical core 201A and the other logical core 201B, when both are in a non-waiting state (i.e., running) as discussed in FIG. 5. In response to meeting/fulfilling the contract threshold for the total number of waiting thresholds between running logical cores 201A and 201B, the operating system 171 marks logical core 201B as the best candidate logical core to contract when logical core 201B has the most waiting logical threads. Accordingly, the operating system 171 removes work (i.e., work units) from a non-waiting logical thread of the logical core 201B and places/assigns the work onto a logical thread/CPU having previously been in a waiting state on the logical core 201A. The operating system 171 then places the other logical core 201B into a waiting state.

The metric application 21 determines/obtains the number of core cycles operating at thread density 1 ($C\_1$), the number of core instructions complete at thread density 1 ($I\_1$), the number of core cycles operating at thread density 2 ($C\_2$), and the number of core instructions complete at thread density 2 ($I\_2$).

The metric application 21 determines/calculates the number of instructions per cycle (IPC) at thread density 1 as $IPC\_1 = I\_1/C\_1$ and the number of instructions per cycle (IPC) at thread density 2 as $IPC\_2 = I\_2/C\_2$. The metric application 21 calculates a runtime maximum capacity metric as runtime maximum capacity=(IPC_2)/(IPC_1) and calculates a runtime productivity metric as runtime productivity= $(I\_1+I\_2)/[IPC\_2*(C\_1+C\_2)]$. The metric application 21 calculates a runtime utilization metric as runtime utilization= $(C\_1+C\_2)*$(runtime productivity) and calculates a runtime available capacity metric as runtime available capacity=[(interval)−(runtime utilization)]*(runtime maximum capacity).

In one embodiment, the hardware controller 50 is configured to determine the instructions per cycle (IPC) at thread density 1, determine the instructions per cycle (IPC) at thread density 2, calculate the runtime maximum capacity metric, calculate the runtime productivity metric, calculate the runtime utilization metric, and calculate the runtime available capacity metric.

A non-waiting thread, a non-waiting core, and a non-waiting CPU are all in a non-waiting state. A non-waiting state may correspond to running, being active, not being idle, and/or being loaded/assigned work. A waiting thread, a waiting core, and a waiting CPU are all in a waiting state. A waiting state may correspond to not running, not being loaded with work, being idle or on standby, and/or not being loaded with a thread (for a core).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for simultaneous multithreading (SMT) by a computer, the method comprising:
managing, by an operating system or a second-level hypervisor of the computer, a logical core configuration for simultaneous multithreading, the operating system or the second-level hypervisor having control over a logical core and control over logical threads on the logical core;
configuring, by the operating system or the second-level hypervisor of the computer, a host hypervisor to assign an entirety of the logical core to a single physical core, such that one logical core executes per physical core;
running the logical core on the single physical core on an exclusive basis for a period of time, such that the logical threads of the logical core execute on physical threads of the single physical core;
determining core cycles operating at a thread density of 1 ($C\_1$), wherein the thread density of 1 is a physical core that includes 1 non-waiting thread and 1 waiting thread;
determining core instructions complete at the thread density of 1 ($I\_1$);
determining core cycles operating at a thread density of 2 ($C\_2$), wherein the thread density of 2 is the physical core that includes 2 non-waiting threads such that no threads are waiting;
determining core instructions complete at the thread density of 2 ($I\_2$); and
wherein each physical core comprises one or more counters for determining core cycles operating at a thread density of 1 ($C\_1$), for determining core instructions complete at a thread density of 1 ($I\_1$), for determining core cycles operating at a thread density of 2 ($C\_2$), and for determining core instructions complete at a thread density of 2 ($I\_2$);
wherein for every clock cycle, a number of non-waiting threads on the physical core determines whether the one or more counters for determining core cycles operating at the thread density of 1 ($C\_1$) increments or whether the one or more counters for determining core cycles operating at the thread density of 2 ($C\_2$) increments;
wherein for every completed instruction, the number of non-waiting threads on the physical core determines whether the one or more counters for determining core instructions complete at the thread density of 1 ($I\_1$) increments or whether the one or more counters for determining core instructions complete at a thread density of 2 ($I\_2$).

2. The method of claim 1, wherein the host hypervisor assigns one entire logical core to one physical core at a time for the exclusive basis to perform simultaneous multithreading.

3. The method of claim 1, further comprising relating a workload of what the single physical core is executing back to the work assigned to the logical threads of the logical core by the operating system or the second level hypervisor.

4. The method of claim 1, wherein the operating system or the second-level hypervisor manages the logical core and at least another logical core as the logical core configuration; and
wherein the operating system or the second-level hypervisor places new work on non-waiting logical cores that have a waiting thread available before placing work on waiting logical cores.

5. The method of claim 4, further comprising determining that a contract threshold is met for a total number of waiting threads across multiple non-waiting cores;
in response to meeting the contract threshold for the total number of waiting threads, marking a best candidate logical core having a most waiting logical threads to contract; and
removing work from a non-waiting logical thread on a contracting logical core and placing the work onto a waiting logical thread on a running logical core.

6. The method of claim 5, further comprising placing the contracting logical core and all its logical threads into a waiting state.

7. The method of claim 1, further comprising determining instructions per cycle (IPC) at a thread density of 1 as $IPC\_1=I\_1/C\_1$; and
determining instructions per cycle (IPC) at a thread density of 2 as $IPC\_2=I\_2/C\_2$.

8. The method of claim 7, further comprising calculating a runtime maximum capacity metric as runtime maximum capacity=$(IPC\_2)/(IPC\_1)$;
calculating a runtime productivity metric as runtime productivity=$(I\_1+I\_2)/[IPC\_2*(C\_1+C\_2)]$;
calculating a runtime utilization metric as runtime utilization=$(C\_1+C\_2)*$(runtime productivity); and
calculating a runtime available capacity metric as runtime available capacity=$[(interval) -(runtime\ utilization)]*$(runtime maximum capacity), where the interval is a total length of time that elapsed during a predetermined workload representative sample.

9. The method of claim 8, wherein a hardware controller is configured to determine the instructions per cycle (IPC) at a thread density of 1, determine the instructions per cycle (IPC) at a thread density of 2, calculate the runtime maximum capacity metric, calculate the runtime productivity metric, calculate the runtime utilization metric, and calculate the runtime available capacity metric.

10. A computer program product for simultaneous multithreading (SMT), the computer program product comprising a computer readable storage medium having program instructions embodied therewith, the program instructions executable by a computer to cause the computer to perform a method comprising:
managing, by an operating system or a second-level hypervisor of the computer, a logical core configuration for simultaneous multithreading, the operating system or the second-level hypervisor having control over a logical core and control over logical threads on the logical core;
configuring, by the operating system or the second-level hypervisor of the computer, a host hypervisor to assign an entirety of the logical core to a single physical core, such that one logical core executes per physical core;
running the logical core on the single physical core on an exclusive basis for a period of time, such that the logical threads of the logical core execute on the single physical core;
determining core cycles operating at a thread density of 1 ($C\_1$), wherein the thread density of 1 is a physical core that includes 1 non-waiting thread and 1 waiting thread;
determining core instructions complete at the thread density of 1 ($I\_1$);
determining core cycles operating at a thread density of 2 ($C\_2$), wherein the thread density of 2 is the physical core that includes 2 non-waiting threads such that no threads are waiting, wherein a non-waiting thread is executing on the physical core and a waiting thread is idle and not executing;

determining core instructions complete at the thread density of 2 ($I\_2$); and wherein each physical core comprises one or more counters for determining core cycles operating at a thread density of 1 ($C\_1$), for determining core instructions complete at a thread density of 1 ($I\_1$), for determining core cycles operating at a thread density of 2 ($C\_2$), and for determining core instructions complete at a thread density of 2 ($I\_2$);

wherein for every clock cycle, a number of non-waiting threads on the physical core determines whether the one or more counters for determining core cycles operating at the thread density of 1 ($C\_1$) increments or whether the one or more counters for determining core cycles operating at the thread density of 2 ($C\_2$) increments;

wherein for every completed instruction, the number of non-waiting threads on the physical core determines whether the one or more counters for determining core instructions complete at the thread density of 1 ($I\_1$) increments or whether the one or more counters for determining core instructions complete at a thread density of 2 ($I\_2$).

11. The computer program product of claim 10, wherein the host hypervisor assigns one entire logical core to one physical core at a time for the exclusive basis to perform simultaneous multithreading.

12. The computer program product of claim 10, further comprising relating a workload of what the single physical core is executing back to the work assigned to the logical threads of the logical core by the operating system or the second level hypervisor.

13. The computer program product of claim 10, wherein the operating system or the second-level hypervisor manages the logical core and at least another logical core as the logical core configuration; and wherein the operating system or the second-level hypervisor places new work on non-waiting logical cores that have a waiting thread available before placing work on waiting logical cores.

14. The computer program product of claim 13, further comprising determining that a contract threshold is met for a total number of waiting threads across multiple non-waiting cores;

in response to meeting the contract threshold for the total number of waiting threads, marking a best candidate logical core having a most waiting logical threads to contract; and removing work from a non-waiting logical thread on a contracting logical core and placing the work onto a waiting logical thread on a running logical core.

15. The computer program product of claim 14, further comprising placing the contracting logical core and all its logical threads into a waiting state.

16. The computer program product of claim 10 further comprising determining instructions per cycle (IPC) at a thread density of 1 as $IPC\_1 = I\_1/C\_1$; and determining instructions per cycle (IPC) at a thread density of 2 as $IPC\_2 = I\_2/C\_2$.

17. The computer program product of claim 16, further comprising calculating a runtime maximum capacity metric as runtime maximum capacity=$(IPC\_2)/(IPC\_1)$;

calculating a runtime productivity metric as runtime productivity=$(I\_1+I\_2)/[IPC\_2*(C\_1+C\_2)]$;

calculating a runtime utilization metric as runtime utilization=$(C\_1+C\_2)*$(runtime productivity); and calculating a runtime available capacity metric as runtime available capacity=$[$(interval)$-$(runtime utilization)$]*$(runtime maximum capacity), where the interval is a total length of time that elapsed during a predetermined workload representative sample.

18. An apparatus for simultaneous multithreading (SMT), the apparatus comprising: a computer; and memory comprising computer-executable instructions that, when executed by the computer, cause the computer to perform operations comprising:

managing, by an operating system or a second-level hypervisor of the computer, a logical core configuration for simultaneous multithreading, the operating system or the second-level hypervisor having control over a logical core and control over logical threads on the logical core;

configuring, by the operating system or the second-level hypervisor of the computer, a host hypervisor to assign an entirety of the logical core to a single physical core, such that one logical core executes per physical core;

running the logical core on the single physical core on an exclusive basis for a period of time, such that the logical threads of the logical core execute on physical threads of the single physical core;

determining core cycles operating at a thread density of 1 ($C\_1$), wherein the thread density of 1 is a physical core that includes 1 non-waiting thread and 1 waiting thread;

determining core instructions complete at the thread density of 1 ($I\_1$);

determining core cycles operating at a thread density of 2 ($C\_2$), wherein the thread density of 2 is the physical core that includes 2 non-waiting threads such that no threads are waiting, wherein a non-waiting thread is executing on the physical core and a waiting thread is idle and not executing;

determining core instructions complete at the thread density of 2 ($I\_2$); and wherein each physical core comprises one or more counters for determining core cycles operating at a thread density of 1 ($C\_1$), for determining core instructions complete at a thread density of 1 ($I\_1$), for determining core cycles operating at a thread density of 2 ($C\_2$), and for determining core instructions complete at a thread density of 2 ($I\_2$);

wherein for every clock cycle, a number of non-waiting threads on the physical core determines whether the one or more counters for determining core cycles operating at the thread density of 1 ($C\_1$) increments or whether the one or more counters for determining core cycles operating at the thread density of 2 ($C\_2$) increments;

wherein for every completed instruction, the number of non-waiting threads on the physical core determines whether the one or more counters for determining core instructions complete at the thread density of 1 ($I\_1$) increments or whether the one or more counters for determining core instructions complete at a thread density of 2 ($I\_2$).

* * * * *